United States Patent
Alyafaie et al.

(10) Patent No.: US 11,947,774 B1
(45) Date of Patent: Apr. 2, 2024

(54) TECHNIQUES FOR UTILIZING AUDIO SEGMENTS FOR EXPRESSION

(71) Applicant: Amazon Technologies, Inc., Seattle, WA (US)

(72) Inventors: Nadal Alyafaie, Clovis, CA (US); Joseph Flavian Squillace, San Francisco, CA (US); Caleb Prabhakar, Decatur, GA (US); Ashima Sehgal, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

(21) Appl. No.: 17/243,034

(22) Filed: Apr. 28, 2021

(51) Int. Cl.
  *G06F 3/0482* (2013.01)
  *G06F 16/61* (2019.01)
  *G06F 16/635* (2019.01)
  *G06F 16/68* (2019.01)
  *H04L 51/10* (2022.01)

(52) U.S. Cl.
  CPC ............ *G06F 3/0482* (2013.01); *G06F 16/61* (2019.01); *G06F 16/635* (2019.01); *G06F 16/686* (2019.01); *H04L 51/10* (2013.01)

(58) Field of Classification Search
  CPC ...... G06F 3/0482; G06F 16/61; G06F 16/635; G06F 16/686; H04L 51/10
  See application file for complete search history.

(56) References Cited

U.S. PATENT DOCUMENTS

| | | | |
|---|---|---|---|
| 2011/0106819 A1* | 5/2011 | Brown | G06F 16/367 707/E17.017 |
| 2015/0088848 A1* | 3/2015 | Halt | H04L 51/52 707/706 |
| 2015/0372952 A1* | 12/2015 | Lefar | H04L 51/10 709/206 |
| 2019/0034527 A1* | 1/2019 | Gardner | H04W 4/12 |
| 2019/0340193 A1* | 11/2019 | Tucey | G06F 16/24578 |
| 2019/0384831 A1* | 12/2019 | Alonso | G06F 16/3322 |
| 2020/0137011 A1* | 4/2020 | Guthery | G06Q 40/12 |
| 2020/0356593 A1* | 11/2020 | Azzinnari | G06F 3/04855 |
| 2022/0366880 A1* | 11/2022 | Kong | G10H 1/0008 |

* cited by examiner

Primary Examiner — Tan H Tran
(74) Attorney, Agent, or Firm — Kilpatrick Townsend & Stockton LLP

(57) ABSTRACT

Techniques are provided herein for selecting and transmitting snippets from a messaging application. A "snippet" refers to an audio segment of a song that is less than the whole of the song. A user may request to view various audio segments (e.g., by category, by search, etc.) corresponding to portions of respective songs via a user interface of the messaging application. In some embodiments, an audio segment can be selected and metadata associated with that particular audio segment may be transmitted to another computing device where the audio segment can be played (e.g., streamed). In this manner, these snippets can be employed by the user to enhance their chat or texting conversation.

20 Claims, 15 Drawing Sheets

TECHNIQUES FOR UTILIZING AUDIO SEGMENTS FOR EXPRESSION

BACKGROUND

Texting has become a popular form of communication. Users can utilizing messaging applications to text with friends and family. These texts can include conversational enhancements such as pictures, icons, or animations as part of the conversation. By way of example, a user may send an animation that features a cake with the flashing words "Happy Birthday!" instead of composing the words himself. However, the user's experience with conventional messaging application is suboptimal as it provides limited access to such conversational enhancement. Thus, the user's ability to express himself is hampered.

BRIEF DESCRIPTION OF THE DRAWINGS

Various embodiments in accordance with the present disclosure will be described with reference to the drawings, in which.

DETAILED DESCRIPTION

Figure 1:
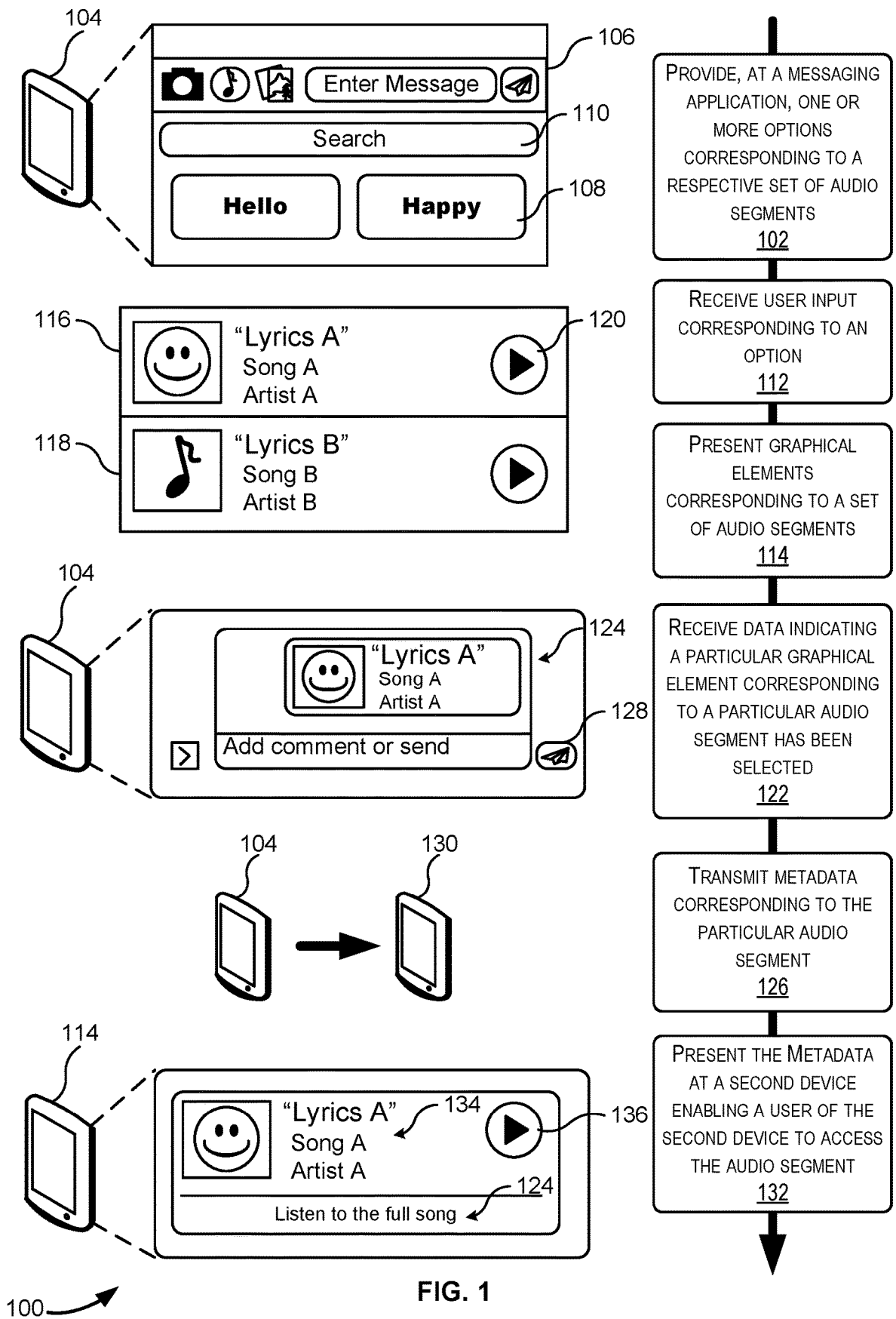
FIG. 1 is a flow for an exemplary process for selecting and transmitting an audio segment, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Conventionally, users can use gifs, animations, and/or emoji to enhance their chat or texting experience. These types of communication enhancements allow users to convey meaning in different formats rather than being limited to the written word. The disclosed techniques enable users to use "snippets," audio segments that are a relatively small portion of a corresponding song, to enhance their text or chat experience and convey meaning through musical expression. These snippets can be accessed at the messaging application (e.g., an application for exchanging text messages (SMS, MIMS, etc.) such as iMessage®, Android Messages, etc., a chat application, and the like). By way of example, using interface elements of the messaging application, the user may search for snippets using a search query or access a predefined set of snippets that are associated with a given category (e.g., happy, hello, goodbye, get well, etc.). Once selected, metadata associated with the snippet (e.g., a song title, an artist, a starting index, an ending index, a storage location from which the snippet and/or song can be accessed/requested, etc.) can be transmitted (e.g., via chat, Multimedia Messaging Service (MMS) message, etc.) to another computing device. Both the user that transmitted the snippet, and the receiver can play back the snippet at the messaging application via their chat/text history.

The system, methods, and components discussed herein provide a variety of user interfaces that enable a user to view snippets in a variety of ways. "Snippets," refer to audio segments that are part of, but less than a whole of, a song (also referred to as an "audio track" or "track"). The terms "snippet" and "audio segment" are used interchangeably herein. In some embodiments, the user may peruse various snippets based on selecting one of a predefined set of subject categories. For example, a predefined set of subject categories could include "happy," "sad," and "goodbye," to name a few. A user and his friend can conduct a text messaging conversation. The user can provide various text inputs at a messaging application. The messaging application can provide various graphical user interface (GUI) elements (e.g., buttons, lists, edit boxes, links, etc.) to search for a snippet to transmit as part of the conversation. The user, upon selecting a graphical user interface element (e.g., a button, a menu option, etc.) associated with a particular subject category, may be presented with any suitable number of snippets that have previously been associated with the selected subject category. As a non-limiting example, the user could select via the messaging application the category "happy." Soon after selection, the user may be presented, via a user interface of the messaging application, a set of snippets that have previously been associated with the "happy" category.

As another non-limiting example, the user can enter search query terms at the messaging application in order to conduct a search for snippets to use in his conversation. The search query terms may be used to perform a search of various songs stored in a remote database. In some embodiments, the songs may be accessible as part of a music streaming service to which the user may be required to have a membership and/or suitable sign on credentials that enable access to musical content (e.g., songs) provided by the service. A search query can be performed against a corpus of songs (e.g., songs provided by the music streaming service). Any suitable number of search results may be returned. The number and particular search results returned may depend on the particular searching algorithm employed. In some embodiments, the searching algorithm may search metadata associated with the songs (e.g., artist, title, lyrics, album, category, subcategory, genre, etc.) to identify a set of candidate songs that have some degree of relevance to the search query. A person skilled in the art of search queries would be knowledgeable of a variety of ways in which relevance between a search query and candidate search result could be calculated.

In some embodiments, a set of most-relevant search results (e.g., x number of search results having the highest degree of relevance to the search query as determined by, for example, corresponding relevance scores) may be selected. For each search results, a set of corresponding lyrics may be accessed in order to identify a starting index and ending index for a snippet of the song. In some embodiments, the lyrics may be analyzed with a predefined rule set and/or machine-learning techniques in order to identify lyrics that are most relevant/memorable within the song. Once identified, a corresponding starting index and ending index (e.g., starting/ending time) within the song can be identified for those lyrics. In some embodiments, a snippet (e.g., an audio segment) may be generated that includes the portion of the song that begins at the starting index and ends at the ending index. Metadata corresponding to the snippet (e.g., the song title, cover image, artist, album, label, starting/ending index, a storage location from which the song and/or snippet can be accessed, and/or any suitable data related to the snippet and/or song) can be stored for subsequent use. At least some portion of the metadata corresponding to the snippet can be presented to the user via the messaging application as part of the search results.

The user can select any suitable snippet from the search results provided. The user can play the snippet from the search result list, from his message application prior to transmission, and/or from the message history after transmission. Upon receiving a transmission request, at least some portion of the snippet's metadata is transmitted to the other computing device (e.g., a computing device of another user conducting the conversation). In some embodiments, the recipient can play the snippet from the messaging application upon receipt. In some embodiments, the recipient may be required to be signed in to a corresponding music streaming service to play back the snippet at the messaging application. If the user (e.g., the sender, the recipient) is not signed in, the user may be prompted to sign in to the music streaming service before playback is enabled.

By utilizing the techniques disclosed herein, the user may use musical segments of known songs to express meaning and enhance his conversations. These musical segments can be searched for, selected, accessed, played back, etc. all from the messaging application such that the user need not leave his messaging application to utilize such musical expressions. The techniques described above and below may be implemented in a number of ways and in a number of contexts. Several example implementations and contexts are provided with reference to the following figures, as described below in more detail. However, the following implementations and contexts are but a few of many.

Moving on to FIG. 1 which illustrates a flow 100 for selecting and transmitting an audio segment (e.g., a snippet), in accordance with at least one embodiment.

The flow 100 may begin at 102, where one or more options corresponding to a respective set of audio segments may be provided at a messaging application of a computing device (e.g., computing device 104, a smartphone). Interface 106 may represent a graphical user interface provided at a messaging application. Within interface 106, a number of search options are provided. By way of example, option 108 may be provided for selecting a predefined subject category. Search box 110 may additionally or alternatively be provided to enable the user to search for relevant songs from which a set of relevant audio segments can be generated.

At 112, user input corresponding to an option may be received. By way of example, option 108 may be selected by the user in order to obtain and present a predefined set of audio segments corresponding to the selected subject category (e.g., "Happy"). As another example, the user may enter any suitable number of search terms within search box 110 in generate or otherwise obtain a set of audio segments of relevant songs.

At 114, graphical user interface elements ("graphical elements" for brevity) corresponding to a set of audio segments may be presented. By way of example, graphical element 116 and graphical element 118 may correspond to two audio segments (e.g., snippets) associated with a common subject category. Upon user selection of option 108, graphical element 116 and 118 may be displayed among other audio segments associated with the selected subject category. In some embodiments, graphical elements 116 and/or 118 can include any suitable metadata associated with the subject category. As a non-limiting example, the graphical elements 116 and 118 may include a respective set of lyrics (e.g., lyrics A and B, respectively), a song title (e.g., song A and song B, respectively), and artist associated with the song (e.g., artist A and artist B, respectively), although any suitable information associated with each respective song and/or the audio segment of each song may be included in the metadata and/or displayed at the song graphical elements 116 or 118. In some embodiments, a playback option (e.g., playback option 120) may be provided with a graphical element (e.g., graphical element 116, in this case). The playback option, upon selection, may be configured to play the audio segment at the computing device 104. In some embodiments, playing the audio segment may include transmitting a request to a music streaming service to play a previously-generated audio segment. As another example, the request may include metadata corresponding to the audio segment and/or song such that playback may include playing the song from a starting index to an ending index associated with the audio segment rather than playing a separate audio file (e.g., the previously-generated audio segment) as previously described.

At 122, data may be received indicating that a particular graphical element corresponding to a particular audio segment has been selected. By way of example, the user may select (e.g., via an input device or touch input) graphical element 116. Upon receiving indication of this selection, the metadata may be presented as being embedded within a text message as shown at 124.

At 126, the user may transmit the audio segment (and/or metadata corresponding to the audio segment) by selecting option 128 or an equivalent option. In some embodiments, the audio segment and/or metadata may be transmitted via a text message (e.g., an MMS message) to computing device 130 (a computing device associated with the intended recipient user).

At 132, the metadata associated with the audio segment may be presented as depicted at 134 via a messaging application operating at the receiving computing device (e.g., computing device 130). A playback option 136 may additionally, or alternatively, be presented via the messaging application (e.g., as part of the text conversation). Selecting playback option 136 may cause the audio segment to play at the speakers of the computing device 130. In some embodiments, a link (e.g., hyperlink 138) may be provided that, upon selection, may cause the entire song corresponding to the audio segment to play at the speakers of the computing device 130. In some embodiments, the user of computing device 130 may be required to sign in to an account associated with a music streaming service (e.g., via the messaging application or a separate application associated with the music streaming service) before playback is enabled.

Figure 2:
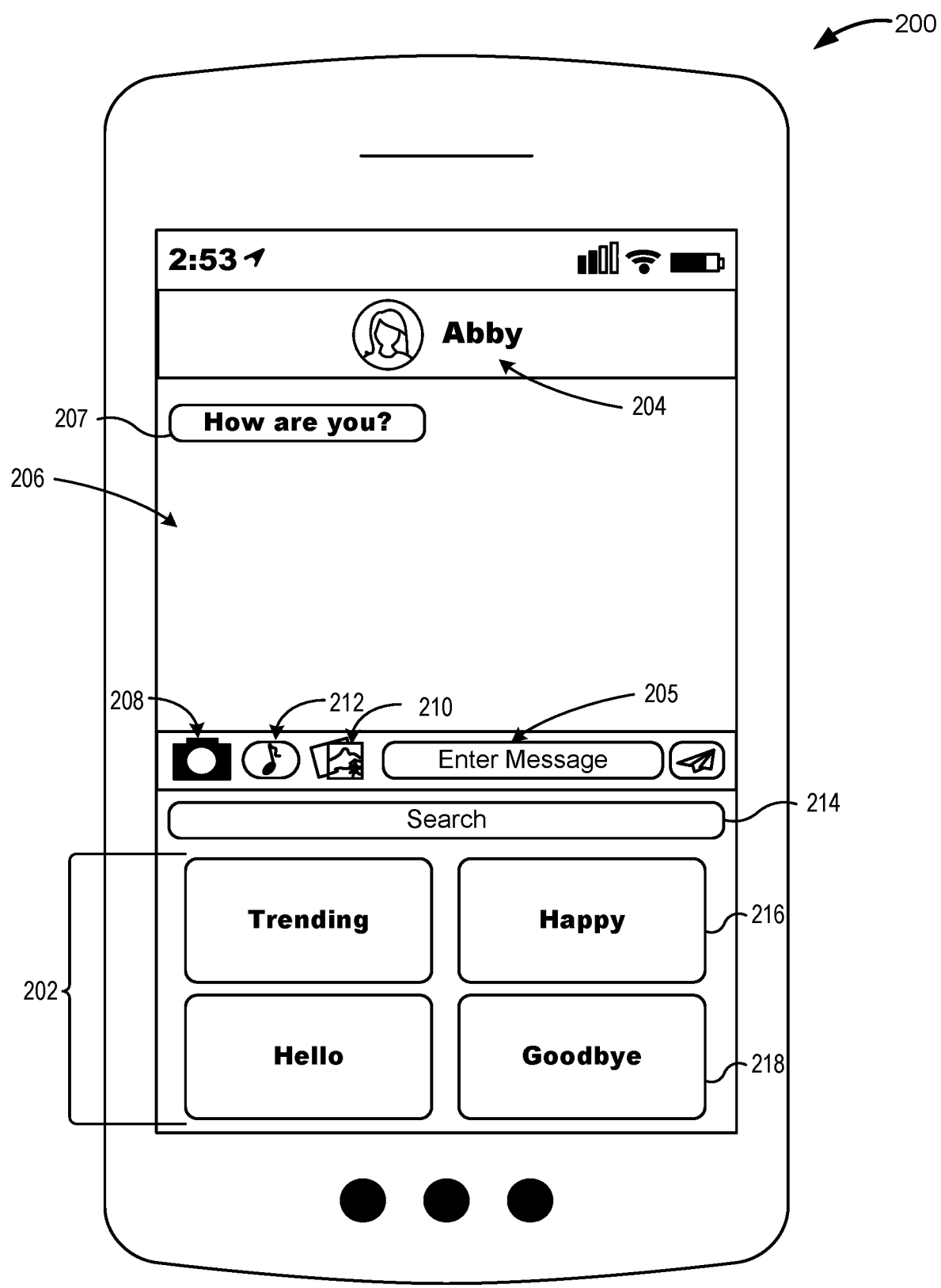
FIG. 2 is an exemplary user interface within a messaging application that provides a categories section for accessing various audio segments, in accordance with at least one embodiment.

FIG. 2 is an exemplary user interface 200 within a messaging application that provides a categories section 202 for accessing various audio segments, in accordance with at least one embodiment. The user interface 200 may be provided as part of a messaging application operating at a computing device (e.g., a user device such as the computing device 104 of FIG. 1). In some embodiments, the user interface 200 may include an intended recipient of a subsequent message (e.g., one or more participants of the conversation). In some embodiments, a graphical element (e.g., the graphical element 204) may include one or more images and/or text indicating the recipient(s)/participant(s). User interface 200 may further include area 206 which can include conversation history including any suitable number of messages exchanged between participants of the conversation. By way of example, message 207 can be received by the computing device (e.g., the computing device 104 of FIG. 1) and displayed as depicted in FIG. 2. The user may enter text for his message via edit box 205.

User interface 200 may include a number of options such as options 208, 210, and 212. Option 208 may correspond to a request to access a camera of the computing device. Option 210 may correspond to a request to access a library of digital images and/or videos locally stored at the device. In some embodiments, option 212 may correspond to a feature for providing audio segments (e.g., snippets). It should be appreciated that, prior to selection of the option 212, the search bar 214 and categories section 202 may not be visible. In some embodiments, selection of the option 212 may cause the messaging application to update the user interface 200 to present categories section 202 and search bar 214. Specific details regarding the search bar 214 will be described in more details in connection with FIG. 6 below. In some embodiments, the option 212 may not be provided and/or may not be selectable until the user has signed in to a user account hosted by a music content provider (e.g., a music streaming service). In some embodiments, if the user has not yet signed into his user account, the user may be prompted (e.g., upon selecting option 212 or at another suitable time) to enter his credentials. The credentials may be validated by the music content provider and, if valid, the user may be allowed access to search bar 214 and/or categories section 202.

Any suitable number of options may be provided with categories section 202. By way of example, four options corresponding to four subject categories are presented as depicted in FIG. 2. Selecting any option within categories section 202 may cause a corresponding set of one or more predefined audio segments (e.g., snippets) to be displayed. As a non-limiting example, selecting option 216 may cause a set of predefined snippets previously associated with the subject category "happy" to be displayed. Similarly, selecting option 218 may cause a set of predefined snippets previously associated with the subject category "goodbye" to be displayed. The number and specific subject categories used may vary. Although 4 subject categories are presented in FIG. 2, any suitable number of subject categories may be viewable from the categories section 202. In some embodiments, categories section 202 is scrollable such that additional subject categories may be viewed by scrolling upward and/or downward within the categories section 202. Each of the subject categories presented within categories section 202 may be previously associated with a particular set of audio segments. As a non-limiting example, the subject category "happy," corresponding to subject category "happy" may include any suitable number of predefined audio segments (e.g., 20, 50, 10, etc.). The set of predefined audio segments associated with the subject category "happy" may be the same or different from a set of predefined audio segments associated with the subject category "goodbye."

Figure 3:
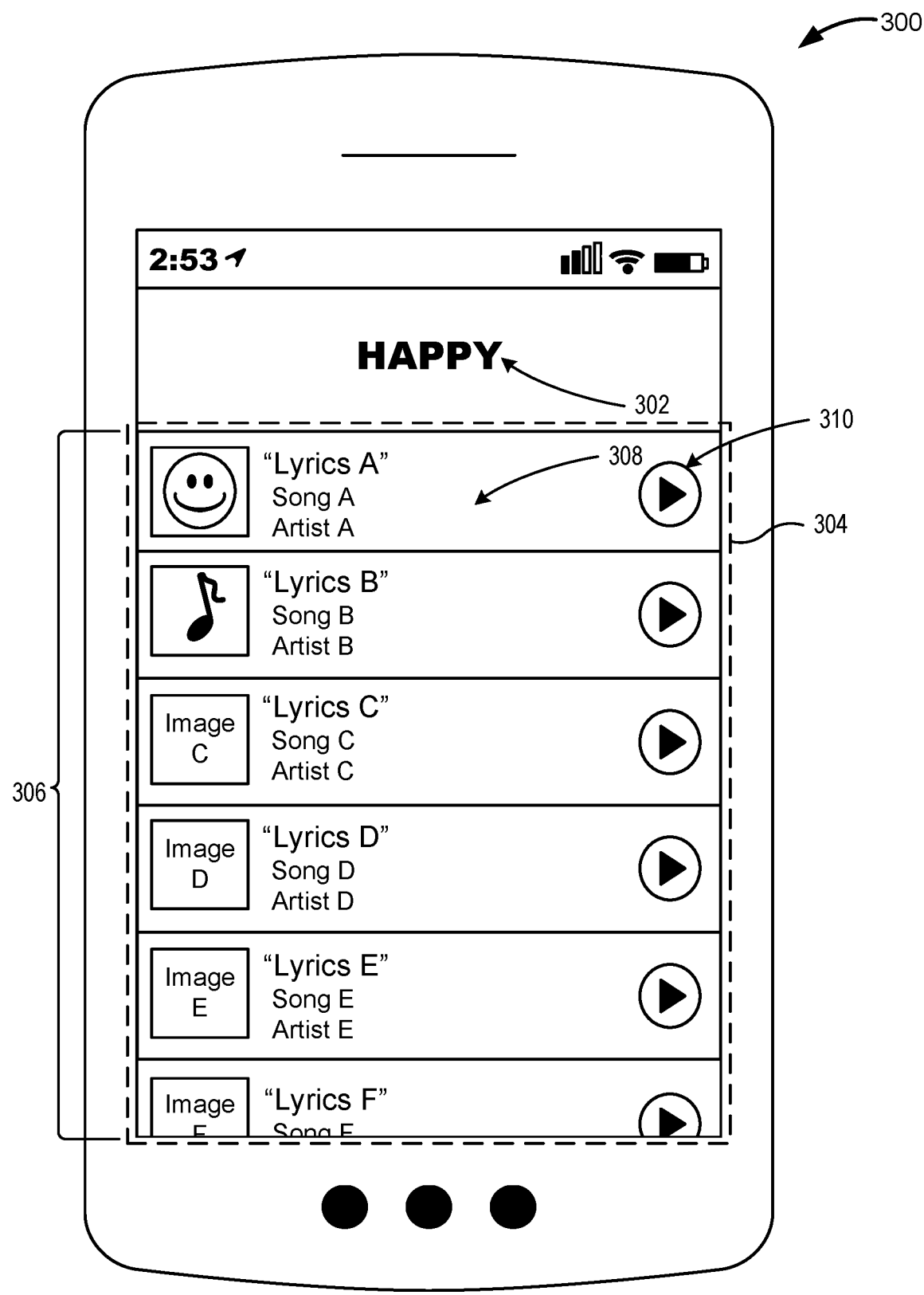
FIG. 3 is an exemplary user interface for presenting various audio segments associated with a category, in accordance with at least one embodiment.

FIG. 3 is an exemplary user interface 300 for presenting various audio segments associated with a category, in accordance with at least one embodiment. User interface 300 is intended to depict a view of the user interface 200 of FIG. 2 after selection of the option 216 corresponding to the subject category "happy." The user interface 300 may be provided by the messaging application operating at computing device 104 of FIG. 1. In some embodiments, the user interface 300 may present metadata 302 corresponding to the selected subject category. As depicted in FIG. 3, metadata 302 includes a title corresponding to the subject category (e.g., "happy"). The user interface 300 may include area 304 that can be used to present any suitable number of graphical elements corresponding to audio segments (e.g., snippets) that are associated with the subject category indicated by metadata 302.

As depicted in FIG. 3, six audio segments (e.g., corresponding to graphical elements 306) are presented, although any suitable number may be provided within area 304. In some embodiments, the user interface 300 may enable the user to scroll upward or downward within a list of the audio segments presented in area 304. As discussed above, each graphical element of graphical elements 306 (e.g., graphical element 308) may present any suitable metadata associated with an audio segment (and/or the song associated with that audio segment). In some embodiments, each audio segment corresponding to the graphical elements 306 may include a portion (not the whole) of different songs. As depicted in FIG. 3, each of the graphical elements 306 present a song title, an artist of the song, an image associated with the song and/or audio segment, and lyrics corresponding to at least a portion of the audio segment to which each graphical element corresponds. In some embodiments, all of the lyrics included in the audio segment are presented, while in other embodiments, some subset of the lyrics are presented in order to format the metadata of the audio segment to fit within the graphical element 308 according to a predefined layout.

Each graphical element of the graphical elements 306 may include a playback option (e.g., playback option 310) which, upon selection, may cause the corresponding audio segment to be played at the computing device. It should be appreciated that any playback features discussed herein may depend on the user being signed in or having access to a user account associated with a music content provider (e.g., a music streaming service). Thus, in any example provided herein, if a user selects a playback option or otherwise attempts to access content (e.g., a whole song, an audio segment of a song, etc.) the user may be prompted for credentials and those credentials may be validated and access to the user account obtained before playback/access is allowed.

Figure 4:
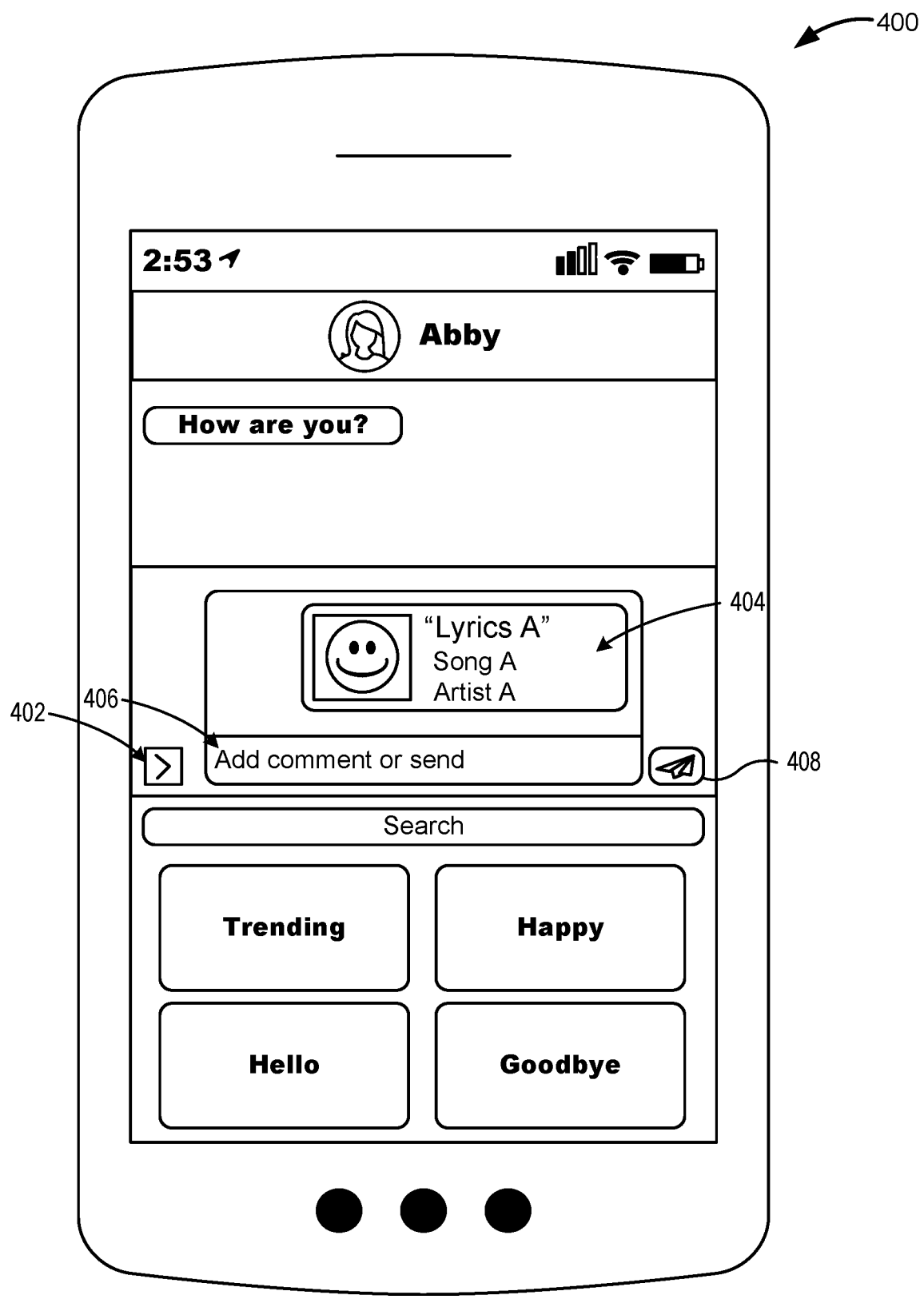
FIG. 4 is an exemplary user interface for transmitting an audio segment, in accordance with at least one embodiment.

FIG. 4 is an exemplary user interface 400 for transmitting an audio segment, in accordance with at least one embodiment. User interface 400 is intended to depict a user interface provided in response to receiving an indication that graphical element 308 was selected. In some embodiments, user interface 400 may be similar to user interface 200 of FIG. 2. For example, participant(s) and conversation history may be presented in user interface 400 as they were in user interface 200. Similarly, a categories section and/or search bar similar to those described in FIG. 2 may once again be displayed via user interface 400. In some embodiments, at least some options (e.g., options 208, 210, and 212 of FIG. 2) may be hidden but accessible via menu option 402.

Upon selecting graphical element 308 of FIG. 3, the messaging application may transition to presenting user interface 400. Metadata corresponding to the selected graphical element may be presented as depicted at 404. The metadata presented at 404 may be the same or different from metadata presented within graphical element 308 of FIG. 3 but corresponds to the same audio segment to which graphical element 308 corresponds. Although not depicted, another playback option may be presented with the metadata at 404 or at any suitable location of user interface 400. In some embodiments, the user may select an option/area 406 to add additional comments to his message. Once satisfied with his message, the user may select option 408 to transmit metadata associated with the audio segment corresponding to graphical element 308 to a computing device associated with the intended recipient (e.g., using an identifier such as a mobile phone number or email address associated with "Abby").

Figure 5:
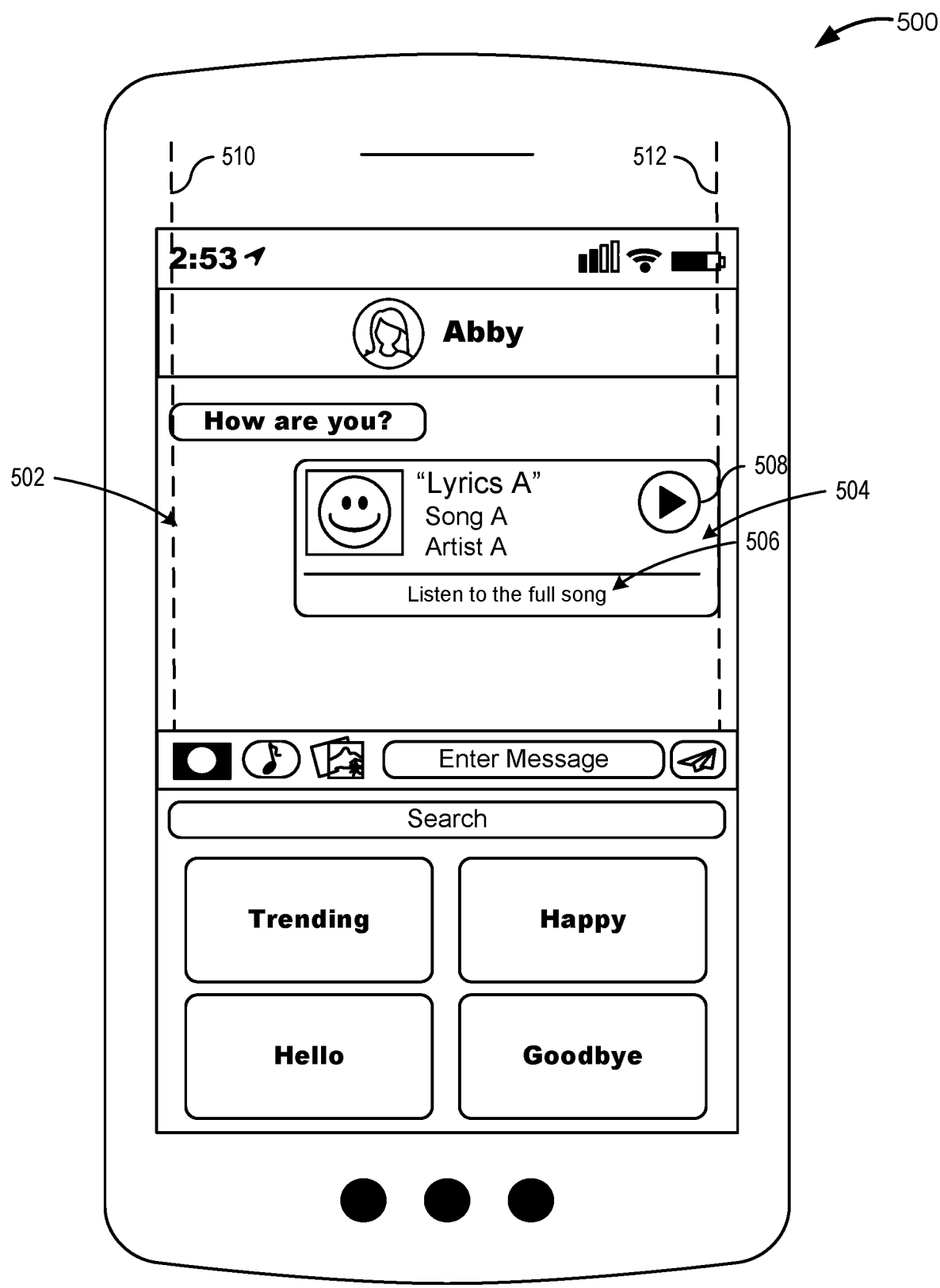
FIG. 5 is an exemplary user interface of a messaging application that enables a user to access a particular audio segment, in accordance with at least one embodiment, in accordance with at least one embodiment.

FIG. 5 is an exemplary user interface 500 of a messaging application that enables a user to access a particular audio segment, in accordance with at least one embodiment. User interface 500 is intended to depict the data presented to the sender after selecting option 408 of FIG. 4. In some embodiments, area 502 (e.g., the area 206 of FIG. 2) may be updated to include metadata associated with a particular audio segment (e.g., metadata associated with the audio segment corresponding to the graphical element 308 of FIG. 3 and transmitted as described in connection with FIG. 4). In some embodiments, the metadata provided at graphical element 504 as part of the conversation history may include the same or different metadata as the metadata presented at graphical element 308 of FIG. 3 and or at 404 of FIG. 4.

As a non-limiting example, metadata associated with an audio segment may include any suitable combination of a song title associated with a song corresponding to the audio segment, an artist of the song, an album with which the song, a release date for the song, lyrics associated with the song and/or audio segment, an image associated with the song and/or audio segment, a starting index and/or ending index for the audio segment, a storage location identifier identifying a storage location for the audio segment, a storage location identifier identifying a storage location for the song, or any suitable information related to the song and/or audio segment. In some embodiments, any suitable portion of the metadata may be presented. By way of example, metadata associated with the song and/or audio segment may be presented within graphical element 504. As depicted the graphical element 504 may present a link (e.g., link 506) to the storage location of the song. In some embodiments, selection of link 506 may cause the song to play (e.g., from the beginning of the song) at the computing device. In some embodiments, playback option 508 may be provided within graphical element 504. Selection of the playback option 508 may cause the audio segment to play at the computing device. In some embodiments, playing either a song and/or an audio segment may refer to operations for streaming the song and/or audio segment to the computing device (e.g., from a server computing device associated with a music content provider such as a music streaming service).

It should be appreciated that any messages originating from the other person/people of the conversation may be aligned with line 510 and messages originating from the user of the computing device may be aligned with line 512 as depicted in FIG. 5. Although not depicted, the recipient's device may present a similar interface as user interface 500, although the messages may be provided in a mirrored representation and/or with a different color or format. By way of example, the message transmitted by the other user (e.g., "Abby") may be appear on user interface presented at her device as being aligned to line 512 while the message corresponding to graphical element 504 may be presented at the other user's device as being aligned to line 510.

Figure 6:
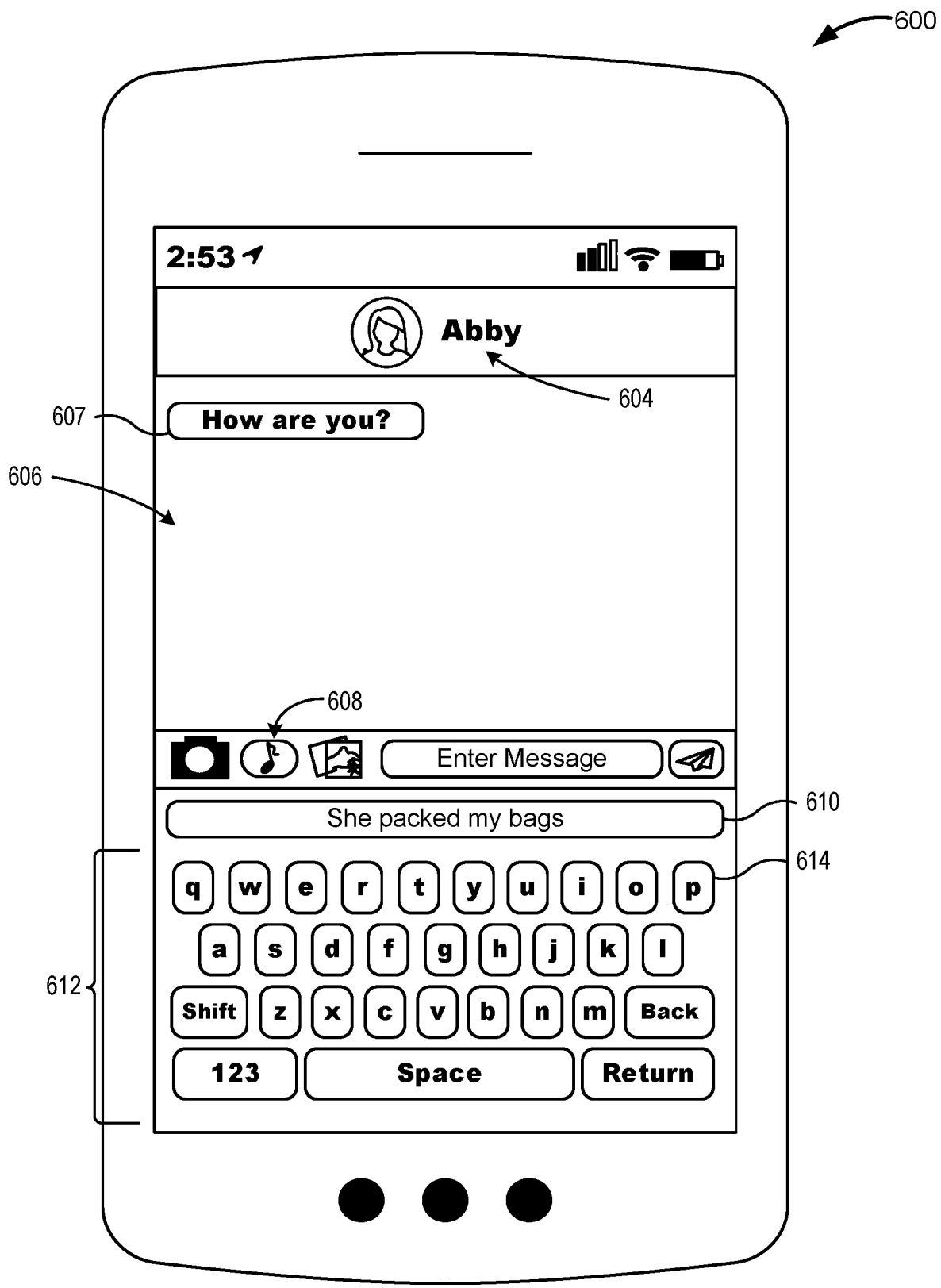
FIG. 6 is an exemplary user interface within a messaging application that provides a searching option that enables a user to search for an audio segment, in accordance with at least one embodiment.

FIG. 6 is an exemplary user interface 600 within a messaging application that provides a searching option that enables a user to search for an audio segment, in accordance with at least one embodiment. The user interface 600 (an example of the user interface 200 of FIG. 2) may be provided as part of a messaging application operating at a computing device (e.g., a user device such as the computing device 104 of FIG. 1). In some embodiments, the user interface 600 may include an intended recipient of a subsequent message (e.g., one or more participants of the conversation). In some embodiments, a graphical element (e.g., the graphical element 604) may include one or more images and/or text indicating the recipient(s)/participant(s). User interface 600 may further include area 606 which can include conversation history including any suitable number of messages exchanged between participants of the conversation. By way of example, message 607 can be received by the computing device (e.g., the computing device 104 of FIG. 1) and displayed as depicted in FIG. 6.

User interface 600 may include a number of options such as 608 (e.g., an example of option 212 of FIG. 2). In some embodiments, option 608 may correspond to a feature for providing audio segments (e.g., snippets). It should be appreciated that, prior to selection of the option 608, the search bar 610 (e.g., the search bar 214 of FIG. 2) and keyboard section 612 may not be visible. Upon selecting option 608, the user interface 600 may be modified to display the search bar 610 and keyboard section 612. In other embodiments, upon selecting the option 608, the search bar 610 and a categories section (e.g., the categories section 202 of FIG. 2) may be displayed (as depicted in FIG. 2). Keyboard section 612 may become visible when the user selects the search bar 610. In some embodiments, keyboard section 612 may replace any categories section (e.g., the categories section 202 of FIG. 2) that may have been visible at the user interface 600 before selection of the search bar 610. In some embodiments, the option 608 may not be provided and/or may not be selectable until the user has signed in to a user account hosted by a music content provider (e.g., a music streaming service). In some embodiments, if the user has not yet signed into his user account, the user may be prompted (e.g., upon selecting option 608 or at another suitable time) to enter his credentials. The credentials may be validated by the music content provider and, if valid, the user may be allowed access to search bar 610 and/or a categories section (e.g., the categories section 202 of FIG. 2, not depicted here in FIG. 6).

Upon selecting search bar 610, the keyboard section 612 may become visible. The keyboard section 612 may provide any suitable number of keys (e.g., key 614) corresponding to a character (e.g., alphabetic character, numeric character, special character, carriage return, etc.) of a given language. The keyboard section 612 may be in any suitable format and provide input in any suitable language. Using the keys in keyboard section 612, the user can enter user input such as one or more search terms (e.g., "she packed my bags").

The search terms entered by the user may be transmitted to a remote computing device (e.g., a server computer operating as part of a music streaming service). The remote computing device may be configured to perform operations to cause a search query to be executed with the submitted search terms against a database of audio files (e.g., musical tracks, songs, etc.). In some embodiments, the remote computing device may execute the search query or the remote computing device may request search results for the query from another computing device or service (e.g., a service configured to identify relevant search results using a search query and a database of audio files). Identifying relevant search results may utilize any suitable method known to one skilled in the art. By way of example, search terms may be compared with any suitable metadata associated with a song (e.g., a song title, lyrics of the song, a genre associated with the song, an album associated with the song, an artist that wrote and/or performed the song, etc.) to identify a similarity between the search term(s) and the song. A number of songs deemed to have over a threshold degree of similarity to the search term(s) may be returned as a set of search results.

Each song of the set of search results may be utilized to generate a corresponding snippet (e.g., audio segment). In some embodiments, lyrics of a song may be indexed such that a location of the lyric(s) within the song may be identified. In some embodiments, the song may be associated with any suitable number of lyric objects that store a particular set of one or more lyrics and a starting index (e.g., a starting time) and ending index (e.g., an ending time) within the song when the corresponding lyrics are heard. The lyric object can include any suitable number of attribute/value pairs. By way of example, a lyric object may be in the following form:

{
  text: "I'm a rocket man",
  startTime: 69783,
  endTime: 72984
} where the "text" attribute of the lyric object is associated with the lyrics "I'm a rocket man", the startTime attribute is associated with the value 69783, and the endTime attribute is associated with the value 72984. The values 69783 and 72984 may indicate an offset (e.g., in milliseconds) from the beginning of the song. In some embodiments, the lyric object may include an lyric index indicating a location of the text within the lyrics of the song. For example, a lyric index may indicate that the particular text is the 11th line of the song lyrics. This is merely an example, a lyric object may include any suitable metadata associated with one or more lyrics within a song which enable the starting index (e.g., a time, an offset, etc.) and ending index (e.g., a time, an offset, etc.) to be identified for those lyrics from within the song. In some embodiments, a lyric object may correspond to any suitable number of words, lines, or portions of a song. For example, in some embodiments, a lyric object may be stored for every n words (e.g., for every word, for every 5 words, etc.), or for every m number of lines (e.g., for each line, for every 2 lines, etc.), for each section (e.g., stanza, chorus, etc.) of the song, or for any suitable portion of the song. In some embodiments, a song may be associated with an array, where each index of the array corresponds to a lyric object/portion of the song (e.g., an array of lyric objects that individually represent a single line of the song lyrics). It should be appreciated that the metadata associated with the lyrics of the song, and/or other metadata associated with the song (e.g., the song title, the art, the associated album, the label, etc.) may be stored in any suitable container (e.g., an array, a linked list, a map, a record, an object, etc.).

In some embodiments, for each song returned as a search result for the query, a most-relevant set of lyrics (e.g., one or more words of the lyrics) may be identified. In some embodiments, a predefined rule set may be utilized to identify a most-relevant set of lyrics. For example, the predefined rule set may include rules that define how a relevancy score is to be calculated for each lyric object based at least in part on the following factors: 1) first and last lines of songs are usually more relevant/better known, 2) repeated lines usually indicate a chorus/section of the song that is more relevant/better known, 3) lines that have text similar to the title are usually more relevant than lines that are not similar to the title, 4) lines that have text similar to the search query are probably more relevant than lines that are less similar to the search query. In some embodiments, the various lyric objects corresponding to different lines of the song may be scored and ranked according to predefined calculations that may be based on the four factors listed above, such that lyric objects that are associated with lyrics that meet any of the four factors above are scored and ranked higher than lyric objects that do not meet any of the four factors above. In some embodiments, the factors may be weighted such that objects associated with lyrics that meet one factor (e.g., factor 1) may be scored and ranked higher than objects associated with lyrics that meet another factor (e.g., factor 2).

Some of the factors listed above require that a similarity between lines must be assessed. For example, one or more similarity scores can be generated that quantifies a degree of similarity between an input lyric (e.g., corresponding to a line of lyrics from the song) and 1) a title of the song, and/or 2) the search query submitted by the user. A number of algorithms may be utilized to identify this similarity. By way of example, a longest common subsequence between a first string representing a set of lyrics (e.g., a string including one or more words of the song, a string including a line of the lyrics, etc.) and a second string representing the title of the song (or the search query) may be identified. A subsequence is a sequence of characters that appear in the same relative order, but not necessarily contiguous. For example, the longest subsequence of the strings "AGGTAB" and "GXTXAYB" is "GTAB" of length 4, because the characters "G," "T," "A," and "B," appear in the same order in both strings. In some embodiments, the longer the longest subsequence of the strings, the more similar the two strings may be considered. As another example, a longest common substring may be identified between the first string and second string. The longest common substring may be the longest contiguous substring that appears in both strings. For example, the longest common substring of "DEABC" and "DCEAB" is "EAB" of length 3. In some embodiments, the longer the longest common substring, the more similar the two strings may be considered. As yet another example, a number of single-character edits (e.g., insert, delete, or substitute) may be identified to transform one string into the other. By way of example, a distance value (e.g., 2) quantifying the number of single-character edits may be identified for the strings "ABC" and "DBEC" based at least in part by identifying that "A" in the first string would need to be changed to "D" and an "E" would need to be inserted after "B" in the first string to change the first string to be equal to the second string. In some embodiments, the lower the distance value, the more similar the two strings may be considered. These may serve as examples, any suitable algorithm for determining a degree of similarity between two strings may be utilized.

In some embodiments, a string associated with a given lyric object (e.g., a line of the lyrics) may be compared to every other string associated with every other lyric object corresponding to the song to identify a degree of similarity. By way of example, utilizing an algorithm for identifying a longest common substring between two strings can be used to compare the strings from two lyric objects. The resulting value (e.g., a length of the longest common substring) may be divided by the sum of the lengths of the two input strings to calculate a similarity score. In some embodiments, this similarity score may be a value between 0 and 1, where 1 represents identical input strings and 0 represents two inputs string that share no common characters. In some embodiments, two substrings with a longest common substring of length less than 3 that result in a score less than 1 (this allows for exact matches on short lines like "oh" or "we") may be assigned a score of 0, since any two strings might share some substring like "e" or "as" but this does not particularly indicate similarity.

In some embodiments, each lyric object may be scored (e.g., assigned a relevancy score) based at least in part on how similar its corresponding lyric is to lyrics of one or more other objects, the title, and/or the search query. In some embodiments, lyric objects that represent lyrics that are similar to a number of other lyrics of the song (e.g., the pair of lyrics were assigned a similarity score over a predefined threshold) may be scored as being more relevant than lyric objects that represent lyrics that are not similar to other lyrics, or are at least similar to fewer other lyrics. In some embodiments, this may cause lyrics that repeat to be scored higher than lines that do not repeat, or repeat a fewer number of times. In some embodiments, a weighted undirected graph may be utilized to identify and track similarity scores between lyric objects and ultimately from which a most-relevant lyric of the song may be selected.

Figure 7:
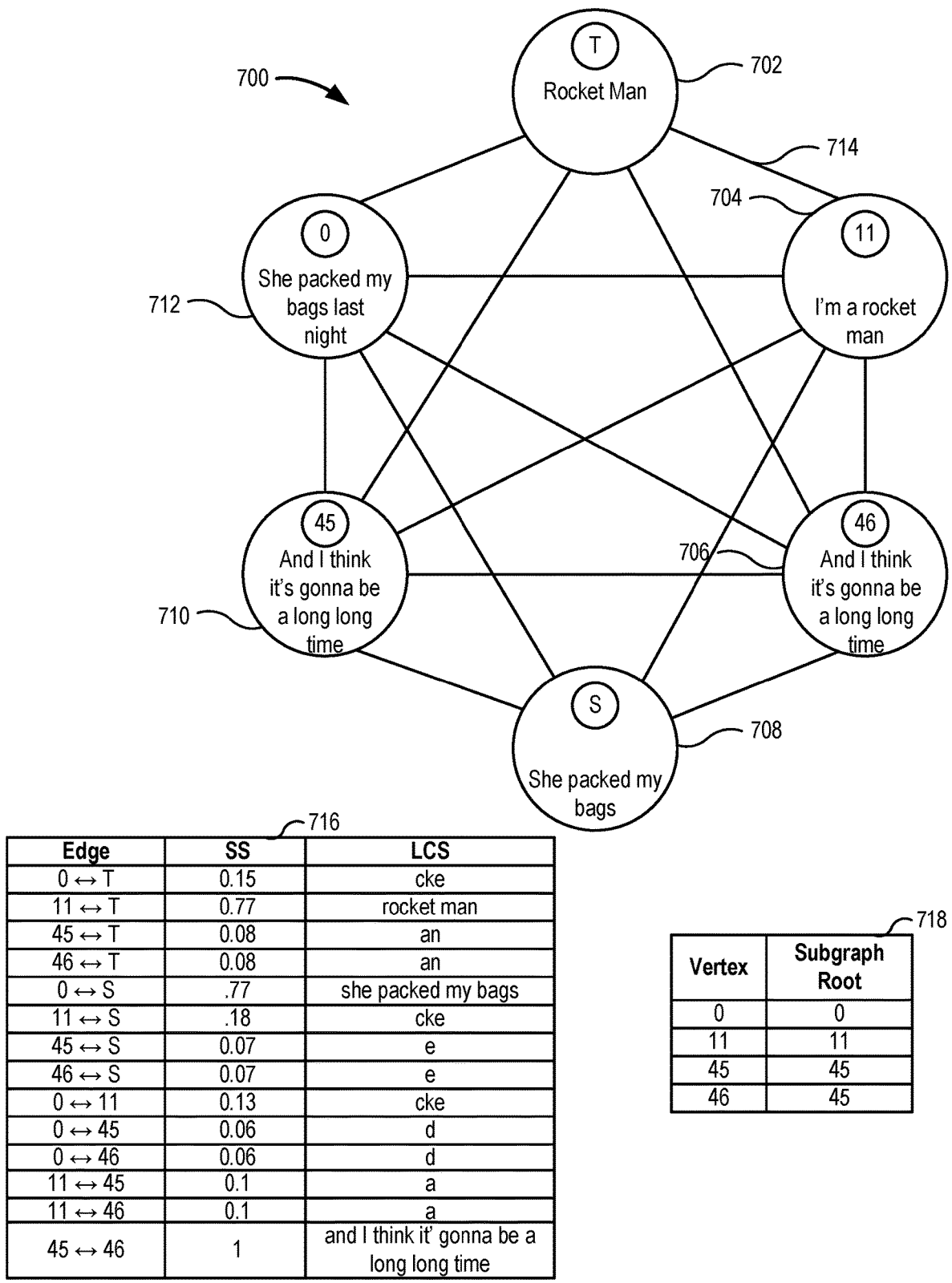
FIG. 7 is an exemplary weighted undirected graph for identifying a most relevant lyric of a song, in accordance with at least one embodiment.

FIG. 7 is an exemplary weighted undirected graph (WUG) 700 for identifying a most-relevant lyric of a song, in accordance with at least one embodiment. WUG 700 may include any suitable number of vertices and edges. Each vertex of WUG 700 (e.g., vertices 702-712) may represent a set of lyrics of a particular granularity (e.g., each line of the song, every 5 words of the song, every 3 words of the song, etc.). Each edge of WUG 700 may be associated with a value (e.g., an edge weight) that quantifies the strength of the similarity of the two vertices which the edge connects. The WUG 700 may have a vertex for each lyric object associated with the song (e.g., corresponding to each line of the lyrics of the song) in addition to a vertex corresponding to the song title and another vertex corresponding to the search query. Each vertex corresponding to a lyric object may be labeled (e.g., from 0-n, etc.) with an index indicating a position within the lyrics. As a non-limiting example, each vertex 704, 706, 710, and 712 may be associated with respective indices 11, 46, 15, and 0 indicating a line number at which the respective lyric is found. It should be appreciated that, for simplicity, WUG 700 of FIG. 7 depicts a subset of the vertices and edges of the song "Rocket Man."

In some embodiments, all index-labeled vertices are connected to each other and to the special vertices 702 and 708, but vertices 702 and 708 may not be connected to each other. In some embodiments, a similarity score for each edge of WUG 700 may be identified based at least in part on the algorithms discussed above (e.g., an algorithm for determining a longest common substring between two input strings). In some embodiments, the two strings corresponding to the two vertices connected by an edge may be used as input to the algorithm to determine a similarity score (e.g., a score quantifying the degree of similarity between the two strings). The similarity score may then be used to assign a value to the edge.

Table 716 depicts the similarity scores and longest common substring for each edge. It should be appreciated that, in some embodiments, edges for which the longest common substring does not meet a predefined threshold length (e.g., at least 3 characters) may be assigned a similarity score of 0. In some embodiments, each vertex of WUG 700 may be assigned a relevance score which can be calculated by summing the weights of all of its incident edges. In some embodiments, the edges that are not incident to S and T may be scaled downward such that similarity scores between a given lyric and the search query and/or title are not lost in a cacophony of similarity scores corresponding to other lyrics. Said another way, a similarity score indicating a degree of similarity between the search query and/or the title may be weighted more heavily than similarity scores corresponding to other lyrics.

In some embodiments, the WUG 700 may be split into multiple connected components. To do so, a predefined similarity threshold value (e.g., 0.5, 0.2, etc.) may be utilized. In some embodiments, only similarity scores that meet or exceed the threshold value may be considered connected for splitting purposes. A depth first search (DFS) may be utilized to traverse the WUG 700 in order to produce a number of subtrees. Table 718 depicts the subtrees. The table 718 indicates that vertices 0 and 11 are each in their own subgraph while vertices 45 and 46 are in a subgraph together. Splitting the WUG 700 may thus cause repeated lines to be split into a common subtree. The root vertex of each subtree and their corresponding relevancy scores may be used to produce a ranked list of vertices. Using the root vertex of each subtree ensures that needless processing for repeated lines is avoided. Only a single instance of a repeated line may be included in the ranked list of vertices. A most-relevant vertex may be selected based at least in part on the relevancy score (e.g., by selecting a highest relevancy score). The lyric corresponding to the most-relevant vertex may be selected as the most-relevant lyric. In some embodiments, an audio segment may be generated using the starting index and ending index from the lyric object associated with the lyric. By way of example, an audio segment may be generated by recording the song from the starting index to the ending index. This audio segment may then be stored as a separate audio file and metadata associated with the audio segment may be generated and stored. By way of example, a location of the audio segment, a title of the corresponding song, the artist, the label, a lyric of the audio segment, the starting index and/or ending index corresponding to the lyric within the song, or the like may be stored (e.g., in the lyric object, in an object associated with the audio segment, or the like).

The process for identifying a most-relevant lyric may be repeated any suitable number of times for any suitable number of the search results returned by executing the search query against a predefined set of audio files (e.g., songs). In some embodiments, a most-relevant lyric may be identified for every song in the search results, while in other embodiments a most-relevant lyric may be identified for a subset of the songs returned in the search results. An audio segment (e.g., a snippet) may be generated for any suitable number of the most-relevant lyrics identified (e.g., all of the most-relevant lyrics identified, the most-relevant lyrics corresponding to the top ten search results, etc.). Although in some embodiments, data related to the most-relevant lyric may be stored (e.g., a starting index and/or an ending index within the song at which the lyric may be found) and a separate audio file need not be generated for the audio segment. Rather, in some embodiments, to playback a given audio segment (e.g., a snippet), the original audio file corresponding to the song may be utilized, where the playback is started and ended at a location/time corresponding to the starting index and ending index associated with the audio segment. In some embodiments, any suitable metadata corresponding to the song and/or audio segment for each search result may be presented at a user interface. In some embodiments, a song and/or an audio segment may be associated with a storage location (e.g., a URL) from which the song and/or audio segment may be accessed (e.g., streamed).

In some embodiments, a most-relevant lyric may be identified for each song utilizing a machine-learning model. A training data set for such a model may include any suitable number of positive and negative examples. A positive example includes a set of lyrics (e.g., object and/or metadata corresponding to different portions of the lyrics of a song) and a particular lyric (e.g., a particular lyric object or metadata) that is indicated (e.g., with a label) to be the most-relevant lyric. A negative example includes a set of lyrics (e.g., object and/or metadata corresponding to different portions of the lyrics of a song) and a particular lyric (e.g., object or metadata) that is indicated (e.g., with a label) to not be the most-relevant lyric. By way of example, the training set may include an object or another suitable container which stores metadata corresponding to each set of lyrics. For example, a lyric object may be used to reference particular portions of the song. In some embodiments, a lyric object may correspond to each line of the song and/or groupings of any suitable number of words (e.g., every word, every two words, or any suitable number of contiguous words of the songs). The lyric object may include the set of lyrics corresponding to the object, a starting index indicating a location within the song at which the set of lyrics start, an ending index indicating a location within the song at which the set of lyrics end, a label indicating a positional index of the set of lyrics within the song (e.g., the 12th line of the song, words 50-56 of the song, etc.), or any suitable metadata associated with the set of lyrics corresponding to the lyric object.

As another non-limiting example, a machine-learning model may be trained to rank a set of lyrics associated with a song. The training data set for such a model may include any suitable number of lyric objects or metadata. As described above, a lyric object may correspond to each line of the song and/or groupings of any suitable number of words and may store any suitable metadata associated with the set of lyrics (e.g., the lyrics corresponding to the object, the starting index within the song, the ending index within the song, a relative position of the lyrics with respect to other lyrics and/or positional index of the lyrics within the song, or any suitable data associated with the lyrics). In some embodiments, a training data example may include a scored and/or ranked set of lyrics objects. By way of example, a training set example may include any suitable number of lyric objects associated with a song which are scored and potentially ranked or sorted by that score to provide an ordered set of lyric objects. For example, the training set may include lyric objects that collectively include every lyric of the song, with each lyric/lyric object assigned a score and/or ranked according to relevance.

The training data set(s) described above may be utilized, individually and/or collectively, with any suitable supervised, unsupervised, semi-supervised, and/or reinforced learning algorithm to train a machine-learning model to identify, from a set of input lyrics (e.g., a set of lyric objects corresponding to the lyrics of a song), a most-relevant input lyric. A portion of the training data may be utilized to train the machine-learning model and another portion of the training data may be utilized to verify an accuracy of the model (e.g., by comparing output provided by the model to known labels of the portion of training data provided to the model as input). Once trained (e.g., having an accuracy over a threshold value), the machine-learning model may be utilized to identify most-relevant lyrics of a set of lyrics corresponding to a song. In some embodiments, the input and output provided by the machine-learning model may be added to the training set and the machine-learning model may be updated and/or retrained with the new example(s).

In some embodiments, any suitable data may be utilized (e.g., as part of a training data set or otherwise) to identify a most-relevant lyric (e.g., line of a song, portion of a song, etc.). By way of example, any suitable third-party data may be utilized to identify a relevancy score for the various lyrics of the song. The third-party data may include data indicating a number of users (e.g., over a threshold number of users) have referred to a song by a particular lyric. For example, the third-party data may indicate that user's have historically provided a voice command such as "play the song that goes 'walk this way'" over a threshold number of times, where 'walk this way' corresponds to a particular set of lyrics of the song. This data may be utilized to score the set of lyrics that include "walk this way" with a higher relevancy score than other lyrics which do not include "walk this way." In some embodiments, the third-party data may include annotations or other information that indicates a relevancy for various lyrics. By way of example, the third-party data may indicate, through annotation or a score, that particular lyrics are more relevant than others. Any suitable portion of this third-party data may be utilized to score and/or rank the lyrics of a song. This data may be used by itself or in conjunction with any suitable data discussed herein to score and/or rank the lyrics of a song.

Figure 8:
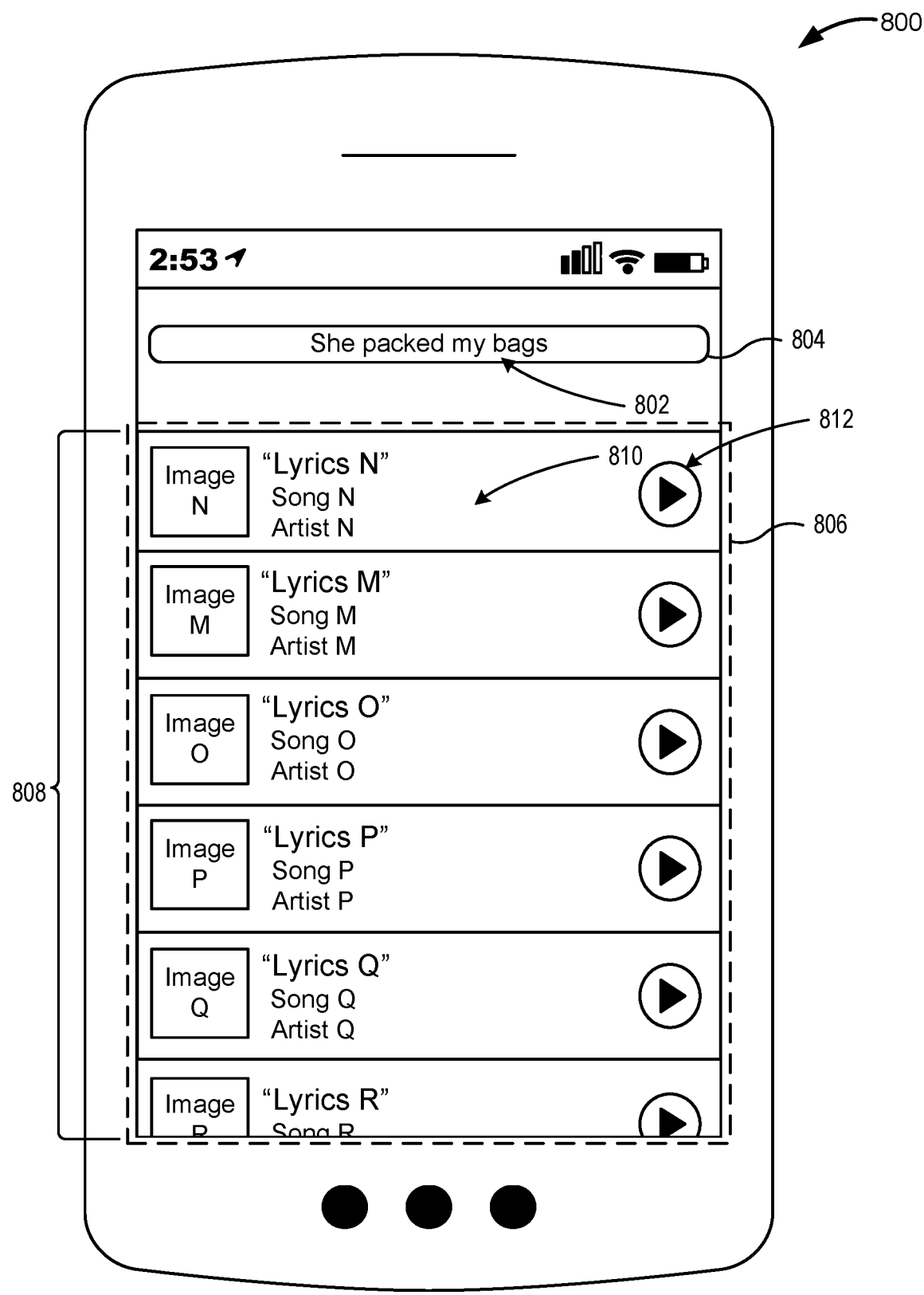
FIG. 8 is an exemplary user interface for presenting search results including a set of audio segments, in accordance with at least one embodiment.

FIG. 8 is an exemplary user interface 800 for presenting search results including a set of audio segments, in accordance with at least one embodiment. User interface 800 is intended to depict a view of the user interface 600 of FIG.

6 after a search query (e.g., "she packed my bags") was submitted. The user interface 800 may be provided by the messaging application operating at computing device 104 of FIG. 1. In some embodiments, the user interface 800 may present the search query at 802. In some embodiments, the search query can be presented alone or within a search bar (e.g., search bar 804) which may be used to perform additional searches. The user interface 800 may include area 806 that can be used to present any suitable number of graphical elements (e.g., graphical elements 808) corresponding to audio segments (e.g., snippets) that were identified and/or generated based at least in part on the operations discussed above in connection with FIGS. 6 and 7.

As depicted in FIG. 6, six audio segments (e.g., corresponding to graphical elements 808) are presented, although any suitable number may be provided within area 806. In some embodiments, the user interface 800 may enable the user to scroll upward or downward within a list of the audio segments presented in area 806. As discussed above, each graphical element of graphical elements 808 (e.g., graphical element 810) may present any suitable metadata associated with an audio segment (and/or the song associated with that audio segment). In some embodiments, each audio segment corresponding to the graphical elements 808 may include a portion (not the whole) of different songs. As depicted in FIG. 8, each of the graphical elements 808 present metadata including a song title, an artist of the song, an image associated with the song and/or audio segment, and lyrics corresponding to at least a portion of the audio segment to which each graphical element corresponds. In some embodiments, all of the lyrics corresponding to the audio segment are presented, while in other embodiments, some subset of the lyrics are presented in order to format the metadata of the audio segment to fit within the graphical element 308 according to a predefined layout.

Each graphical element of the graphical elements 808 may include a playback option (e.g., playback option 812) which, upon selection, may cause the corresponding audio segment to be played at the computing device. It should be appreciated that any playback features discussed herein may depend on the user being signed in or having access to a user account associated with a music content provider (e.g., a music streaming service). Thus, in any example provided herein, if a user selects a playback option or otherwise attempts to access content (e.g., a whole song, an audio segment of a song, etc.) the user may be prompted for credentials and those credentials may be validated and access to the user account obtained before playback/access is allowed.

Figure 9:
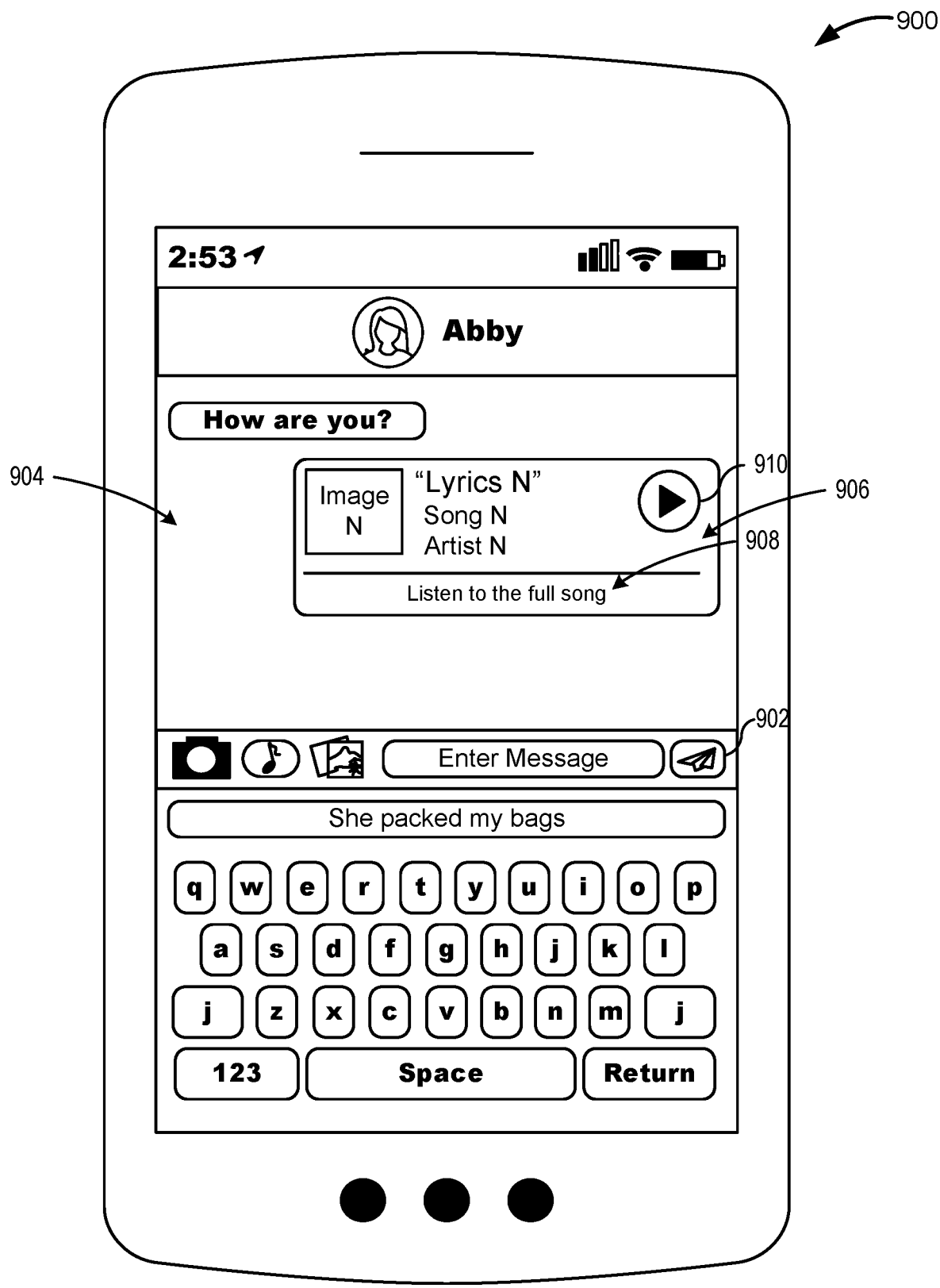
FIG. 9 is another exemplary user interface of a messaging application that enables a user to access data associated with a transmitted audio segment, in accordance with at least one embodiment.

FIG. 9 is another exemplary user interface 900 of a messaging application that enables a user to access data associated with a transmitted audio segment, in accordance with at least one embodiment. User interface 900 is intended to depict the data presented to the sender after selecting graphical element 810 of FIG. 8 corresponding to a particular audio segment, and subsequently transmitting the metadata associated with audio segment to another device by selecting option 902 of FIG. 9 (an example of option 408 of FIG. 4). In some embodiments, area 904 (e.g., the area 206 of FIG. 2) may be updated to include conversation history (e.g., messages transmitted between the user of the computing device and another user (e.g., Abby)). In some embodiments, area 904 may include metadata associated with a particular audio segment (e.g., metadata associated with the audio segment corresponding to the graphical element 810 of FIG. 8 and transmitted in a similar manner as described in connection with FIG. 4) already transmitted to the other user. In some embodiments, the metadata provided at graphical element 906 as part of the conversation history may include the same or different metadata as the metadata presented at graphical element 308 of FIG. 3 and or at 404 of FIG. 4.

As a non-limiting example, metadata associated with an audio segment may include any suitable combination of a song title associated with a song corresponding to the audio segment, an artist of the song, an album with which the song, a release date for the song, lyrics associated with the song and/or audio segment, an image associated with the song and/or audio segment, a starting index and/or ending index for the audio segment, a storage location identifier identifying a storage location for the audio segment, a storage location identifier identifying a storage location for the song, or any suitable information related to the song and/or audio segment. In some embodiments, any suitable portion of the metadata may be presented. By way of example, metadata associated with the song and/or audio segment may be presented within graphical element 906. As depicted the graphical element 906 may present a link (e.g., link 908) to the storage location of the song. In some embodiments, selection of link 908 may cause the song to play (e.g., from the beginning of the song) at the computing device. In some embodiments, playback option 910 may be provided within graphical element 906. Selection of the playback option 910 may cause the audio segment to play at the computing device. In some embodiments, playing either a song and/or an audio segment may refer to operations for streaming the song and/or audio segment to the computing device (e.g., from a server computing device associated with a music content provider such as a music streaming service).

Figure 10:
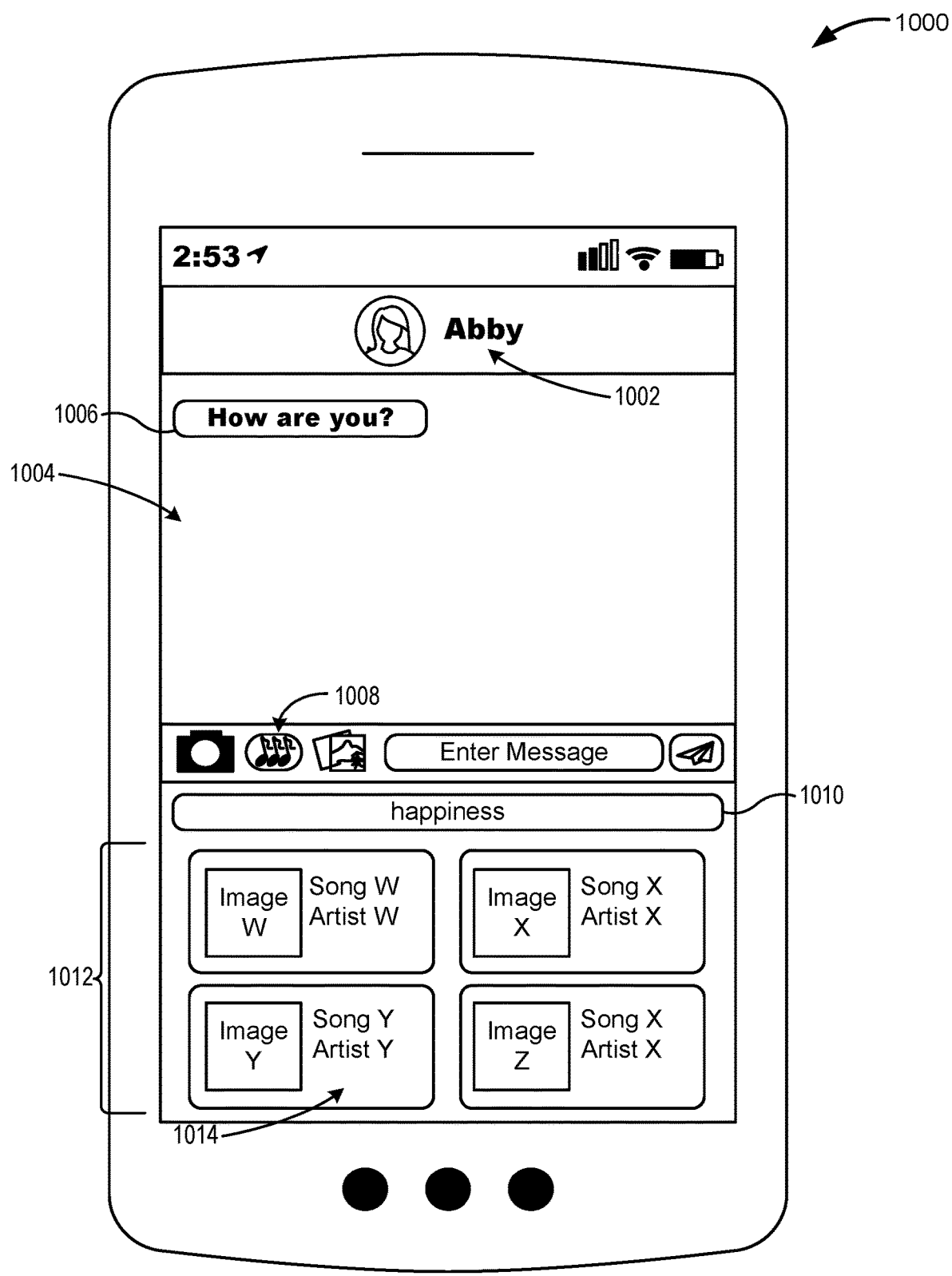
FIG. 10 is another exemplary user interface for presenting search results including a set of audio segments, in accordance with at least one embodiment.

FIG. 10 is another exemplary user interface 1000 for presenting search results including a set of audio segments, in accordance with at least one embodiment. In some embodiments, user interface 1000 may be provided as part of a messaging application operating at a computing device (e.g., a user device such as the computing device 104 of FIG. 1). In some embodiments, the user interface 1000 may include an intended recipient of a subsequent message (e.g., one or more participants of the conversation). In some embodiments, a graphical element (e.g., the graphical element 1002) may include one or more images and/or text indicating the recipient(s)/participant(s). User interface 1000 may further include area 1004 which can include conversation history including any suitable number of messages exchanged between participants of the conversation. By way of example, message 1006 can be received by the computing device (e.g., the computing device 104 of FIG. 1) and displayed as depicted in FIG. 10.

User interface 1000 may include a number of options such as 1008 (e.g., an example of option 212 of FIG. 2). In some embodiments, option 1008 may correspond to a feature for providing audio segments (e.g., snippets). It should be appreciated that, prior to selection of the option 1008, the search bar 1010 (e.g., the search bar 214 of FIG. 2) and a corresponding keyboard section (not depicted) may not be visible. Upon selecting option 1008, the user interface 1010 may be modified to display the search bar 610 (and a keyboard section such as keyboard section 612 of FIG. 6). In other embodiments, upon selecting the option 1008, the search bar 1010 and a keyboard section may be displayed as similarly depicted at FIG. 6. A keyboard section may become visible when the user selects the search bar 1010. In some embodiments, the option 1008 may not be provided and/or may not be selectable until the user has signed in to a user account hosted by a music content provider (e.g., a music streaming service). In some embodiments, if the user has not yet signed into his user account, the user may be prompted (e.g., upon selecting option 1008 or at another suitable time) to enter his credentials. The credentials may be validated by the music content provider and, if valid, the user may be allowed access to search bar 1010.

Upon selecting search bar 1010, a keyboard section (not depicted in FIG. 10, but similar or the same as the keyboard section 612 of FIG. 6) may become visible. The keyboard section may provide any suitable number of keys corresponding to a character (e.g., alphabetic character, numeric character, special character, carriage return, etc.) of a given language. The keyboard section may be in any suitable format and provide input in any suitable language. Using the keys in keyboard section, the user can enter user input such as one or more search terms (e.g., "she packed my bags").

The search terms entered by the user may be transmitted to a remote computing device (e.g., a server computer operating as part of a music streaming service). The remote computing device may be configured to perform operations to cause a search query to be executed with the submitted search terms against a database of audio files (e.g., musical tracks, songs, etc.). In some embodiments, the remote computing device may execute the search query or the remote computing device may request search results for the query from another computing device or service (e.g., a service configured to identify relevant search results using a search query and a database of audio files). Identifying relevant search results may utilize any suitable method known to one skilled in the art. By way of example, search terms may be compared with any suitable metadata associated with a song (e.g., a song title, lyrics of the song, a genre associated with the song, an album associated with the song, an artist that wrote and/or performed the song, etc.) to identify a similarity between the search term(s) and the song. A number of songs deemed to have over a threshold degree of similarity to the search term(s) may be returned as a set of search results.

In some embodiments, the set of search results (e.g., a number of songs) may be provided via graphical elements 1012. In some embodiments, the set of search results may be presented in a user interface similar to user interface 800 of FIG. 8. Each graphical element of 1012 may include any suitable portion of metadata associated with a song (e.g., a song title, an artist, a label, an album, a genre, an image, a release date, or the like). In some embodiments, the user may wish to generate an audio segment for a given song (e.g., song Y). To do so, the user may select a graphical element (e.g., graphical element 1014) to select a song from which an audio segment is to be generated.

It should be appreciated, that selecting a subject category search (as described above in connection with FIGS. 2-5), performing a search which automatically generates audio segments (as described above in connection with FIGS. 6-9), and performing a search to manually generate an audio segment (as described in connection with FIGS. 10-12 can be associated with respective options that are selectable via any of the user interfaces described herein. These options can be presented in-line with option 1008 (e.g., as separate options) or these options may be a sub-option provided in response to selecting option 1008 (or any suitable option associated with snippets such as options 212 and/or 608 of FIGS. 2 and 6, respectively).

Figure 11:
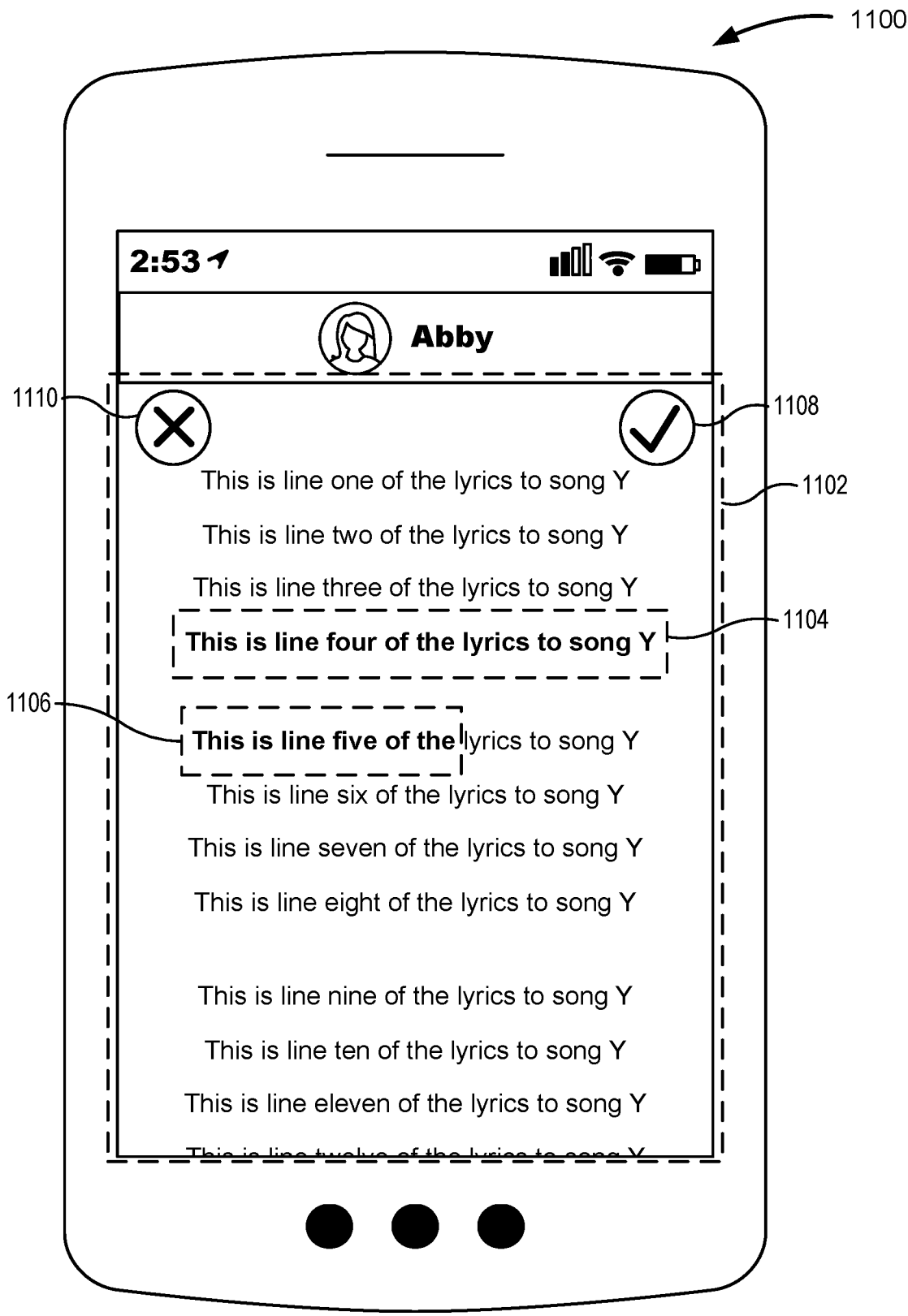
FIG. 11 is an exemplary user interface for specifying a starting index and an ending index with which an audio segment can be generated/identified, in accordance with at least one embodiment.

FIG. 11 is an exemplary user interface 1100 for specifying a starting index and an ending index with which an audio segment can be generated/identified, in accordance with at least one embodiment. The user interface 1100 is intended to depict a user interface provided in response to the user indicating he wishes to manually generate an audio segment (e.g., determined based at least in part on receiving data indicating the graphical element 1014 of FIG. was selected). The audio segment to be generated may correspond to a sub-portion (a part, but not the whole) of a song.

In some embodiments, a set of lyrics associated with the song may be obtained. In some embodiments, the set of lyrics may be previously stored and associated with a song (e.g., via an object and/or mapping associated with the song which stores any/all metadata associated with the song). In some embodiments, the set of lyrics may be generated from obtaining lyrics from a set of objects (e.g., lyric objects) associated with the song. The lyrics depicted in FIG. 11 may be stored in any suitable manner and may be identified based at least in part on an identifier associated with the song (e.g., a unique alphanumeric identifier for the song).

User interface 1100 may include area 1102 within which the lyrics to the song may be displayed/presented. In some embodiments, the user interface may provide scrolling options to scroll upward and/or downward through the lyrics. In some embodiments, the user may select a portion of the lyrics. By way of example, the user may select any suitable portion of the area surrounded by box 1104 to select the fourth line of the lyrics of the song. In other embodiments, the user may draw a box around the lyrics he wishes to select. By way of example, the user may draw the box 1104 to select the fourth line of the lyrics of the song or the user may draw a box 1106 to select any suitable portion of the lyrics such as "This is line five of the" as depicted in FIG. 11. In some embodiments, a box may be presented around the selected lyrics and/or the selected lyrics may be presented in a manner that is distinguishable from the lyrics that were not selected. For example, the selected text may be displayed in a different color, font, size, or the like. Once selected, the user may select an accept option (e.g., accept option 1108) to indicate acceptance of the selected lyrics or a reject option (reject option 1110) to indicate rejection of the selected lyrics. Rejection may cause the selected lyrics to be unselected which in turn may cause the box to disappear or the lyrics to revert to their original state (e.g., the manner in which the lyrics were presented before selection). In some embodiments, the user may only select a portion of the lyrics which corresponds to a lyric object. By way of example, each line within area 1102 may correspond to a lyric object (e.g., the lyric object discussed above in connection with FIGS. 6 and 7). Thus, in this scenario, the user may only select lyrics based on a line granularity (e.g., one and only one line is selectable at a time and the entire line is selected when any portion of the line is selected). If lyric objects corresponding to 3 words are utilized, then the user may be enabled to select any combination of lyrics that correspond to a single lyric object that is individually associated with a particular 3-word lyric.

Once the accept option 1108 is selected, a request may be transmitted from the computing device to a remote computing device (e.g., a server device associated with or operating as part of a music streaming service) to generate an audio segment corresponding to the lyrics selected. In some embodiments, generating an audio segment may include recording and storing a new audio file from a starting index to an ending index within the song and identified from the lyric object corresponding to the lyrics selected. In other embodiments, selecting the acceptance object may return any suitable metadata associated with the song and/or an audio segment (e.g., a lyric object corresponding to the selected lyrics). Thus, in any example provided herein, generating an audio segment may refer to generating a distinct audio file (e.g., the audio file including only the segment of the song from the starting index to the ending index associated with the audio segment/snippet) or generating an audio segment may refer to storing metadata identifying a portion (e.g., between a particular starting index and ending index) of the audio file corresponding to a song.

Figure 12:
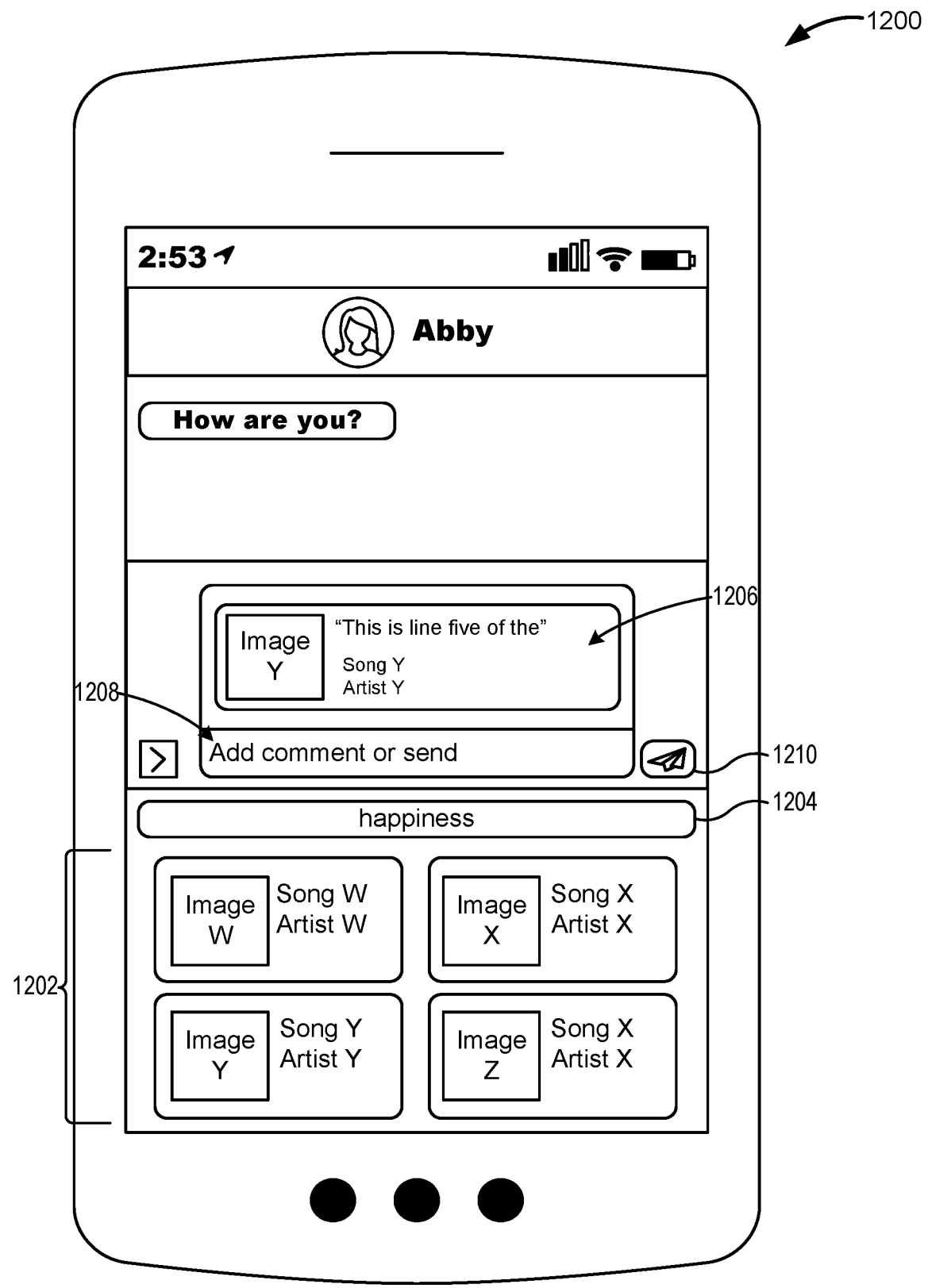
FIG. 12 is another exemplary user interface for transmitting an audio segment, in accordance with at least one embodiment.

FIG. 12 is another exemplary user interface 1200 for transmitting an audio segment, in accordance with at least one embodiment. FIG. 12 is intended to depict a user interface provided in response to receiving an indication that accept option 1108 was selected (e.g., after the lyrics corresponding to box 1106 of FIG. 11 were identified). In some embodiments, user interface 1200 may be similar to user interface 400 of FIG. 4. For example, participant(s) and conversation history may be presented in user interface 1200 as they were in user interface 400. User interface 1200 may also be similar in some respects to user interface 1000 of FIG. 10. By way of example, user interface 1200 may too display graphical elements 1202 (e.g., 1012 of FIG. and search bar 1204 (e.g., search bar 1010 of FIG. 10).

Upon selecting accept option 1108 of FIG. 11, the messaging application may transition to presenting user interface 1200. Metadata corresponding to the selected audio segment (e.g., an audio segment corresponding to the lyrics selected at FIG. 11) may be presented as depicted at 1206. The metadata presented at 1206 may be data associated with the audio segment (and/or song) corresponding to the lyrics selected at FIG. 11. Although not depicted, another playback option may be presented with the metadata at 1206 or at any suitable location of user interface 1200. In some embodiments, the user may select an option/area 1208 to add additional comments to his message. Once satisfied with his message, the user may select option 1210 to transmit metadata associated with the audio segment corresponding to graphical element 1206 to a computing device associated with the intended recipient (e.g., using an identifier such as a mobile phone number or email address associated with "Abby").

Figure 13:
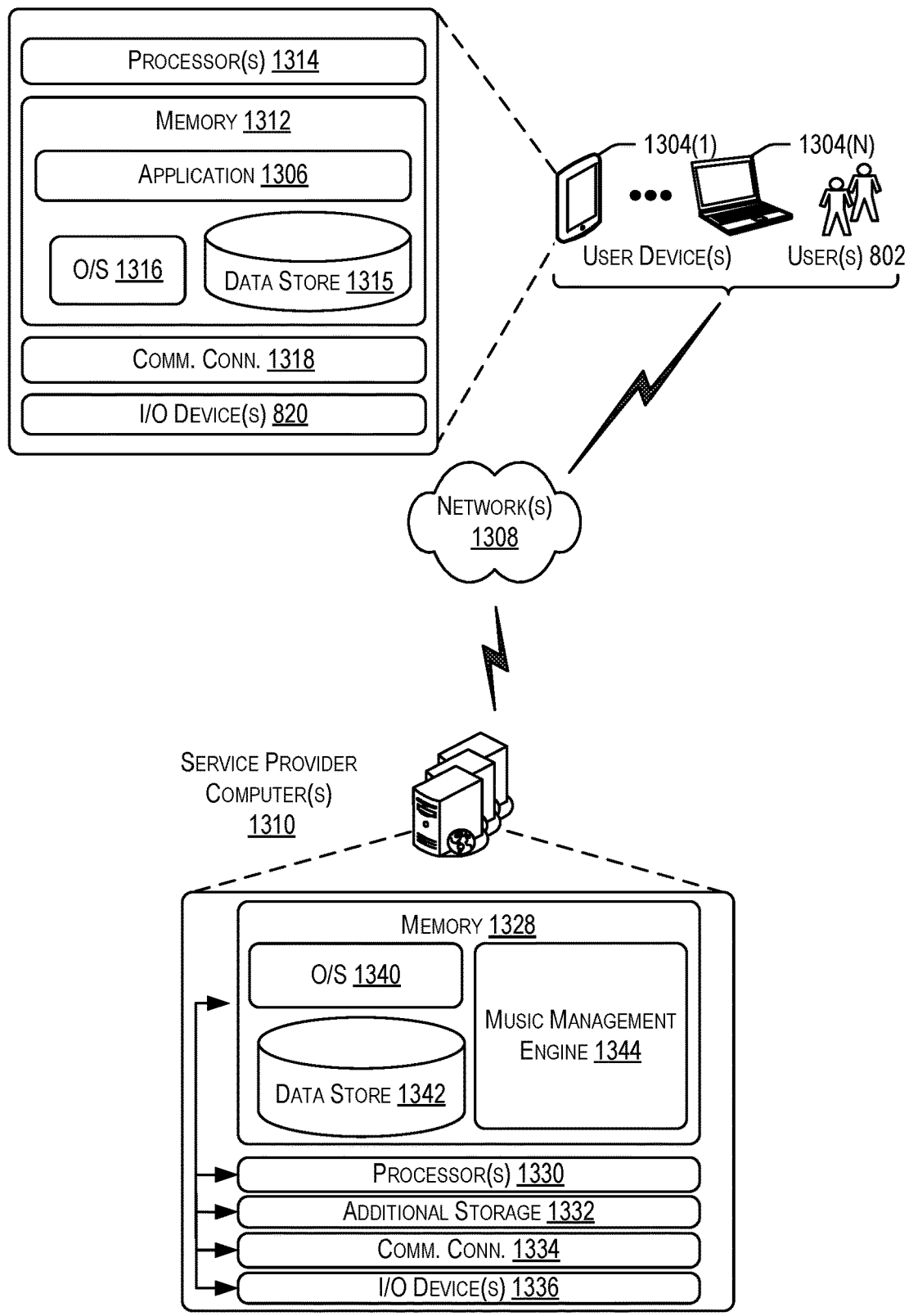
FIG. 13 illustrates components of an audio management system, in accordance with at least one embodiment.

FIG. 13 illustrates components of a system 1300 according to a particular embodiment. In system 1300, one or more users 1302 may utilize a user device (e.g., a user device of a collection of user devices 1304(1)-(N) (collectively, user devices 1304). For example, the user(s) 1302 may access a user interface accessible through an application 1306 (e.g., a messaging application such as an MMS messaging application) running on the user devices 1304 via one or more networks 1308. In some aspects, the application 1306 operating on the user devices 1304 may provide content that can be hosted, managed, and/or provided by a computing resources service or service provider, such as by utilizing one or more service provider computer(s) 1310. As a non-limiting example, the user(s) 1302 may be a customer of music streaming service or other service provider that offers musical content for consumption (e.g., lease, rent, purchase, etc.). The user(s) 1302 may be provided various graphical user interface elements to access, search, select, define, play, and transmit various audio segments (e.g., snippets) corresponding to portions of these songs. The application 1306 may be configured to provide any suitable combination of the user interfaces 200-1200 described above. In some embodiments, user input provided via these user interfaces may be transmitted by the application 1306 to the music management engine 1344, operating as part of service provider computer(s) 1310.

In some examples, the networks 1308 may include any one or a combination of many different types of networks, such as cable networks, the Internet, wireless networks, cellular networks, and other private and/or public networks. While the illustrated example represents the users 1302 accessing application functionality over the networks 1308, the described techniques may equally apply in instances where the users 1302 interact with the service provider computer(s) 1310 via the one or more user devices 1304 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 1310, perhaps arranged in a cluster of servers or as a server farm, may host the application 1306 operating on the user devices 1304 and/or cloud-based software services. Other server architectures may also be used to host the application 1306 and/or cloud-based software services. The application 1306 (e.g., a messaging application associated with SMS/MMS/chat messages, etc.) operating on the user devices 1304 may be capable of handling requests from the users 1302 and serving, in response, various user interfaces that can be rendered at the user devices 1304. The application 1306 operating on the user devices 1304 can present any suitable type of interface that supports user interaction, including search interfaces, interfaces with which an audio segment can be defined, playback interfaces, and the like.

The user devices 1304 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 1304 may be in communication with the service provider computer(s) 1310 via the networks 1308, or via other network connections.

In one illustrative configuration, the user devices 1304 may include at least one memory 1312 and one or more processing units (e.g., processor(s) 1314). The processor(s) 1314 may be implemented as appropriate in hardware, computer-executable instructions, firmware, or combinations thereof. Computer-executable instruction or firmware implementations of the processor(s) 1314 may include computer-executable or machine-executable instructions written in any suitable programming language to perform the various functions described.

The memory 1312 may store program instructions that are loadable and executable on the processor(s) 1314, as well as data generated during the execution of these programs. Depending on the configuration and type of user computing device, the memory 1312 may be volatile (such as random access memory (RAM)) and/or non-volatile (such as read-only memory (ROM), flash memory, etc.). The user devices 1304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1312 may include multiple different types of memory, such as static random access memory (SRAM), dynamic random access memory (DRAM), or ROM.

Turning to the contents of the memory 1312 in more detail, the memory 1312 may include an operating system 1316, one or more data stores 1315, and one or more application programs, modules, or services for implementing the techniques disclosed herein, provided via the application 1306. The application 1306 may be configured to receive, store, and/or display a network page or other interface for interacting with the service provider computer(s) 1310. Additionally, the memory 1312 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 1304 may also contain communications connection(s) 1318 that allow the user devices 1304 to communicate with a stored database, another computing device or server (e.g., the service provider computer(s) 1310), user terminals and/or other devices on the networks 1308. The user devices 1304 may also include I/O device(s) 1320, such as a keyboard, a mouse, a pen, a voice input device, a touch input device, a display, speakers, a printer, etc.

In some aspects, the service provider computer(s) 1310 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1310 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 1310 may be in communication with the user devices 1304 and/or other service providers via the networks 1308 or via other network connections. The service provider computer(s) 1310 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 1310 may include at least one memory 1328 and one or more processing units (e.g., processor(s) 1330). The processor(s) 1330 may be implemented as appropriate in hardware, computer-executable instructions, firmware, or combinations thereof. Computer-executable instruction or firmware implementations of the processor(s) 1330 may include computer-executable or machine-executable instructions written in any suitable programming language to perform the various functions described.

The memory 1328 may store program instructions that are loadable and executable on the processor(s) 1330, as well as data generated during the execution of these programs. Depending on the configuration and type of service provider computer(s) 1310, the memory 1328 may be volatile (such as RAM) and/or non-volatile (such as ROM, flash memory, etc.). The service provider computer(s) 1310 or servers may also include additional storage 1332, which may include removable storage and/or non-removable storage. The additional storage 1332 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1328 may include multiple different types of memory, such as SRAM, DRAM, or ROM.

The memory 1328, the additional storage 1332, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1328 and the additional storage 1332 are all examples of computer storage media. Additional types of computer storage media that may be present in the service provider computer(s) 1310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1310. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 1310 may also contain communications connection(s) 1334 that allow the service provider computer(s) 1310 to communicate with a stored database, another computing device or server, user terminals and/or other devices on the networks 1308. The service provider computer(s) 1310 may also include I/O device(s) 1336, such as a keyboard, a mouse, a pen, a voice input device, a touch input device, a display, speakers, a printer, etc.

Turning to the contents of the memory 1328 in more detail, the memory 1328 may include an operating system 1340, one or more data stores 1342, and/or one or more application programs, modules, or services (e.g., music management engine 1344) for implementing the features disclosed herein. Music management engine 1344 may be configured to perform any suitable operation described above with respect to FIGS. 1-12 related to hosting and/or storing various predefine and/or user-defined snippets, verifying credentials, searching for snippets within a database according to a search query, identifying most-relevant lyrics of a song (including generating any suitable machine-learning model and/or weighted undirected graph(s)), and/or generating/identifying a snippet based on user input (e.g., input identifying a selecting of lyrics). The music management ending 1344 can be configured to communicate metadata corresponding to songs and/or audio segments (e.g., snippets) to the user device 1304. In some embodiments, receipt of such data may cause the user device 1304 (e.g., application 1306) to present metadata corresponding to search results and/or a predefined set of audio segments to be presented at a display of the device. In some embodiments, the metadata associated with a song and/or an audio segment may be stored in data store 1342 or at another suitable storage location accessible to the music management engine 1344. In some embodiments, the music management engine 1344 may operate as part of a music streaming service and may be configured to stream audio segments based at least in part on receiving a request from application 1306 (e.g., a messaging application operating at a user device). The music management engine 1344 may include a plurality of modules (not depicted) that may perform functions in accordance with at least one embodiment. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, be a service responsible for managing data of the type required to make corresponding calculations.

Figure 14:
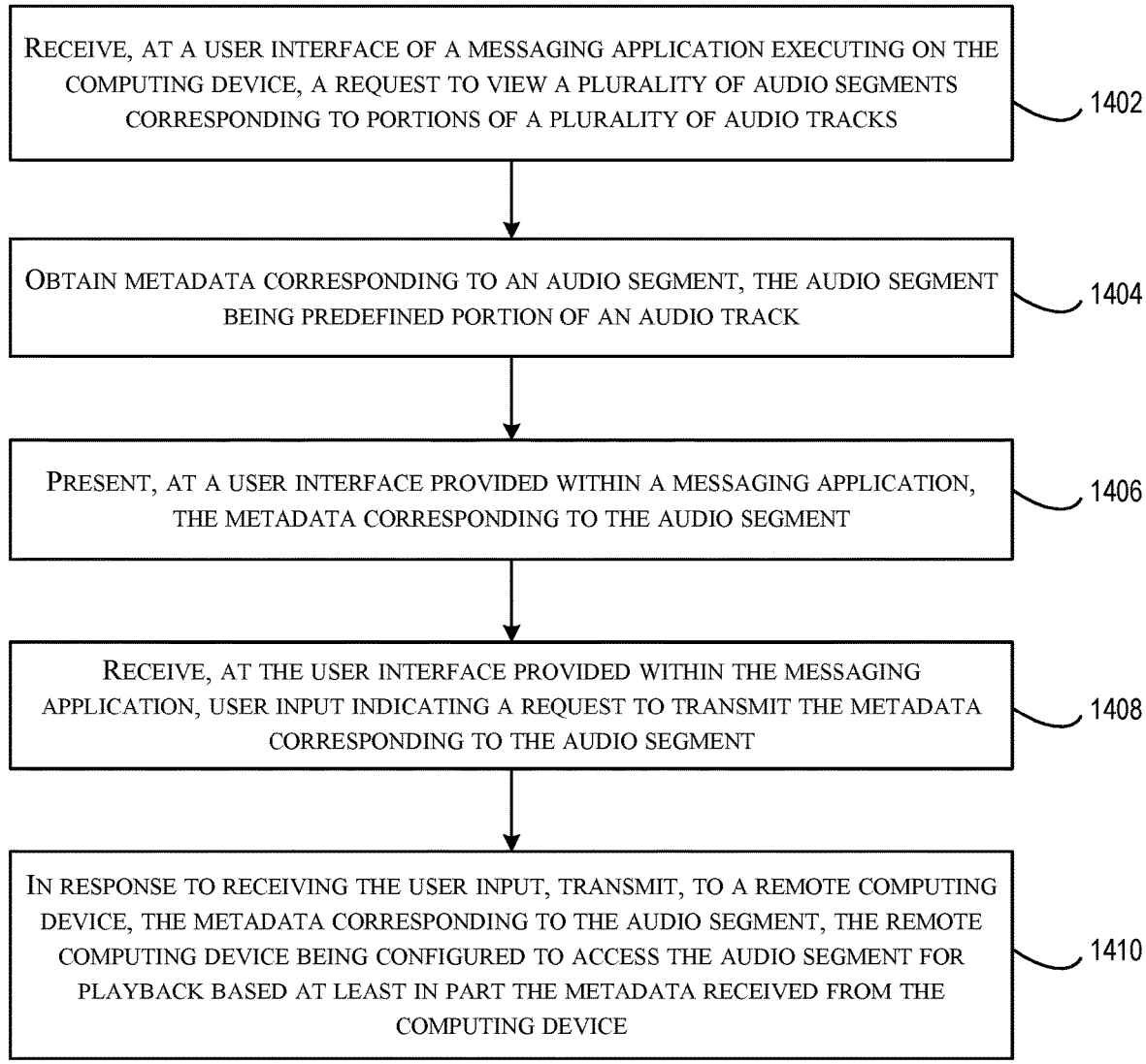
FIG. 14 is a flowchart illustrating an example method for enabling a user to select and transmit an audio segment via a messaging application, in accordance with at least one embodiment.

FIG. 14 is a flowchart illustrating an example method 1400 for enabling a user to select and transmit an audio segment via a messaging application, in accordance with at least one embodiment. The method 1400 may be performed by a computing device. The computing device may include one or more processors, and one or more memories storing computer-executable instructions that, when executed with the one or more processors, cause the computing device to perform the operations of method 1400. In some embodiments, the operations of method 1400 may be performed by an application (e.g., the application 1306 of FIG. 3) operating at the computing device.

The method 1400 may begin at 1402, where a request to view a plurality of audio segments corresponding to portions of a plurality of audio tracks may be received at a user interface of a messaging application executing on the computing device. By way of example, such a request may be transmitted by the messaging application operating at the computing device or as a result of receiving user input at the messaging application. The plurality of audio segments can correspond to a predefined set of audio segments (e.g., when the request pertains to selection of a subject category as would be the case when the option 216 of FIG. 2 was selected). In some embodiments, the plurality of audio segments can correspond to a set of search results (e.g., when a search query is provided as described in connection with FIG. 6).

At 1404, metadata corresponding to an audio segment may be obtained. In some embodiments, the metadata may include any suitable data corresponding to the audio segment (such as the starting index, the ending index, the lyrics of the audio segment, an identifier for the audio segment, etc.) or the song (such as the song title, the artist, the label, the release date, the genre or the like). In some embodiments, the audio segment may be a predefined portion of an audio track (e.g., a line of lyrics of the song).

At 1406, the metadata corresponding to the audio segment may be presented at a user interface provided within a messaging application. By way of example, FIGS. 3 and 8 present user interfaces within which metadata corresponding to an audio segment is presented. For example, FIGS. 3 and 8 present graphical elements 306 and 808, respectively, that individually present metadata associated with a corresponding audio segment.

At 1408, user input may be received at the user interface provided within the messaging application. For example, the user input may include data indicating that the option 408 or 902 of FIGS. 4 and 9, respectively, was selected. In some embodiments, the user input may indicate a request to transmit the metadata corresponding to the audio segment.

At 1410, in response to receiving the user input, the metadata corresponding to the audio segment may be transmitted to a remote computing device (e.g., the service provider computer(s) 1310 of FIG. 3, operating as part of a music streaming service). In some embodiments, the remote computing device may be configured to access the audio segment for playback based at least in part the metadata received from the computing device. By way of example, the metadata corresponding to the audio segment may include an identifier for the audio segment and/or song, the starting index and the ending index corresponding to the audio segment between which the audio segment can be found within the song. In some embodiments, the remote computing device may be configured to utilize the identifier for the audio segment to obtain and stream (or otherwise provide) an audio file corresponding to the audio segment to the requesting device. In some embodiments, the remote computing device may be configured to obtain an audio file corresponding to the identifier of the song and stream (or otherwise provide playback for) the portion of the audio file corresponding to the part between the starting index and ending index.

Figure 15:
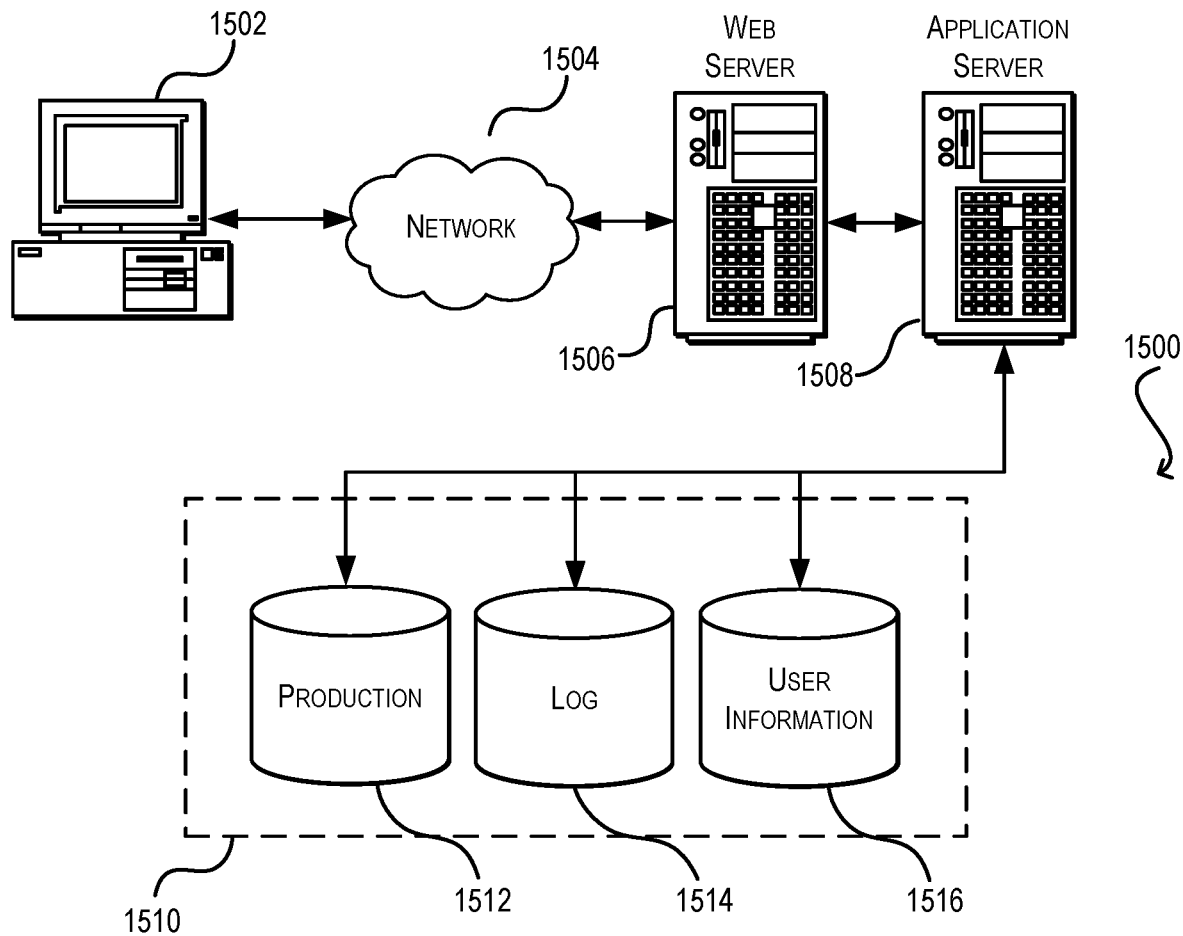
FIG. 15 is a schematic diagram illustrating an environment in which various embodiments can be implemented.

FIG. 15 is a schematic diagram illustrating an environment 1500 in which various embodiments can be implemented. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    presenting, by a messaging application of a first computing device, a user interface configured to provide a plurality of options for obtaining information corresponding to a plurality of audio segments, each audio segment being associated with a subset of a respective song;
    receiving, at the user interface of the messaging application, user input corresponding to an option of the plurality of options presented at the user interface, user input comprising a search query;
    identifying a plurality of search results comprising a plurality of songs, the plurality of search results being identified based at least in part on executing the search query;
    for each of the plurality of songs identified in the plurality of search results:
        obtaining a plurality of lyric objects corresponding to a song of the plurality of songs;
        identifying, based at least in part on the search query, a most-relevant set of lyrics, the most-relevant set of lyrics corresponding to a lyric object selected from the plurality of lyric objects based at least in part on providing the plurality of lyric objects as input to a machine-learning model, the machine-learning model being trained to identify the most-relevant set of lyrics of the plurality of lyric objects based at least in part on a supervised learning algorithm; and automatically generating a respective audio segment for the most-relevant set of lyrics selected for the song;

presenting, at the user interface of the messaging application, a plurality of graphical elements corresponding to a plurality of automatically generated audio segments that were individually generated for each of the plurality of songs identified in the plurality of search results;

receiving, at the user interface of the messaging application, an indication that a particular graphical element of the plurality of graphical elements was selected, the particular graphical element corresponding to a particular audio segment of the plurality of automatically generated audio segments;

presenting, at the user interface of the messaging application, at least a portion of metadata associated with the particular audio segment, the metadata comprising the most-relevant set of lyrics of the audio segment; and transmitting, to a second computing device, the metadata associated with the particular audio segment, the second computing device being configured to access the audio segment for playback based at least in part the metadata received from the first computing device.

2. The computer-implemented method of claim 1, wherein generating the respective audio segment for the respective song is further based at least in part on a title associated with the respective song of the plurality of songs, the plurality of lyric objects corresponding to the respective song, and positions associated with the plurality of lyric objects that correspond to respective sets of lyrics within the respective song.

3. The computer-implemented method of claim 1, wherein at least one audio segment that is automatically generated corresponds to a starting index that differs from a beginning of the respective song, and wherein at least one audio segment generated corresponds to an ending index that is different from an end of the respective song.

4. The computer-implemented method of claim 1, wherein the respective audio segment is a distinct file that is generated to include a respective portion of the song corresponding to the lyric object.

5. The computer-implemented method of claim 1, wherein the machine-learning model is further trained based at least in part on a training data set comprising an example set of lyric objects of which a most relevant lyric object is known.

6. A computing device, comprising:
one or more processors; and
one or more memories comprising computer-executable instructions that, when executed with the one or more processors, cause the computing device to:
receive, at a user interface of a messaging application executing on the computing device, a search request comprising a query;
identify an audio track from a plurality of audio tracks based at least in part on executing the query;
in response to identifying the audio track:
obtain a plurality of lyric objects corresponding to the audio track;
identify, based at least in part on the query, a most-relevant set of lyrics, the most-relevant set of lyrics corresponding to a lyric object that is selected from the plurality of lyric objects based at least in part on providing the plurality of lyric objects as input to a machine-learning model, the machine-learning model being trained to identify the most-relevant set of lyrics of the plurality of lyric objects based at least in part on a supervised learning algorithm; and
obtain an audio segment corresponding to the most-relevant set of lyrics selected for the audio track;
store the audio segment at a storage location at which the audio segment is accessible;
obtain metadata corresponding to the audio segment;
present, at the user interface of the messaging application, at least a portion of the metadata corresponding to the audio segment;
receive, at the user interface provided within the messaging application, user input indicating a transmission request to transmit the metadata corresponding to the audio segment; and
in response to receiving the user input, transmit, to a remote computing device, the metadata corresponding to the audio segment, the remote computing device being configured to access the audio segment for playback based at least in part the metadata received from the computing device.

7. The computing device of claim 6, wherein the metadata comprises at least one of: one or more lyrics of the audio segment, a title corresponding to the audio track, an artist corresponding to the audio track, a first location identifier corresponding to a first storage location of the audio segment, or a second location identifier corresponding to a second storage location of the audio track.

8. The computing device of claim 6, wherein executing the executable instructions further causes the computing device to present graphical elements corresponding to a plurality of predefined musical categories, each of the predefined musical categories being associated with a predefined plurality of audio segments.

9. The computing device of claim 8, wherein executing the executable instructions further causes the computing device to:
receive, at the user interface, input indicating a particular musical category of the plurality of predefined musical categories was selected; and
present a plurality of audio segments in response to receiving the input, the plurality of audio segments comprising the audio segment, each of the plurality of audio segments being associated with different songs.

10. The computing device of claim 6, wherein the audio segment is accessible to a server device, the server device being configured to stream the audio segment to a plurality of devices, the plurality of devices comprising the remote computing device.

11. The computing device of claim 6, wherein the messaging application is a text messaging application.

12. The computing device of claim 6, wherein the lyric object is selected from the plurality of lyric objects further based at least in part on a position associated with each of the plurality of lyric objects and wherein the metadata corresponding to the audio segment comprises a starting index and an ending index for the audio segment and a title of the audio track.

13. The computing device of claim 12, wherein each of the plurality of lyric objects correspond to a respective line of lyrics of the audio track.

14. A computer-readable storage medium having one or more memories storing computer executable instructions that, when executed with one or more processors of a computing device, causes the computing device to:

receive, at a user interface of a messaging application executing on the computing device, a request comprising a search query;

identify an audio track from a plurality of audio tracks based at least in part on the search query;

in response to identifying the audio track:
- obtain a plurality of lyric objects corresponding to the audio track;
- identify, based at least in part on the search query, a most-relevant set of lyrics of the audio track, the most-relevant set of lyrics corresponding to a lyric object selected from the plurality of lyric objects based at least in part on providing the plurality of lyric objects as input to a machine-learning model, the machine-learning model being trained to identify the most-relevant set of lyrics of the plurality of lyric objects based at least in part on a supervised learning algorithm; and
- obtain an audio segment corresponding to the most-relevant set of lyrics selected for the audio track;

store the audio segment at a storage location at which the audio segment is accessible;

present, at the user interface of the messaging application, at least a portion of metadata corresponding to the audio segment, the metadata comprising at least the storage location at which the audio segment is accessible;

receive, at the user interface of the messaging application, user input indicating a transmission request to transmit the metadata corresponding to the audio segment; and in response to receiving the user input, transmit, to a remote computing device, the metadata corresponding to the audio segment, the remote computing device being configured to access the audio segment based at least in part the storage location received from the computing device.

15. The computer-readable storage medium of claim 14, wherein selecting the lyric object from the plurality of lyric objects corresponding to the audio track further comprises generating a weighted undirected graph comprising a plurality of nodes and edges, each node corresponding to a given lyric object of the plurality of lyric objects corresponding to the audio track, each edge representing a degree of similarity between two nodes.

16. The computer-readable storage medium of claim 14, wherein the audio segment has a starting index and an ending index that differs from a respective start index and a respective ending index of the audio track.

17. The computer-readable storage medium of claim 14, wherein the computing device operates as part of a streaming service, the streaming service configured to provide streaming playback of the audio segment.

18. The computer-readable storage medium of claim 17, wherein executing the executable instructions further causes the computing device to verify access to the streaming service based at least in part on a set of credentials, wherein access is verified prior to obtaining the metadata corresponding to the audio segment.

19. The computer-readable storage medium of claim 14, wherein each lyric object of the plurality of lyric objects corresponding to the audio track is associated with a string, a corresponding start time of a lyric associated with the string within the audio track, and a corresponding end time of the lyric associated with the string within the audio track.

20. The computer-readable storage medium of claim 14, wherein the lyric object is selected from the plurality of lyric objects further based at least in part on: 1) identifying a first and last line of lyrics associated with the audio track, 2) identifying repeated lyrics associated with the audio track, 3) identifying first lyrics associated with the audio track that are similar to a title associated with the audio track, and 4) identifying second lyrics associated with the audio track that are similar to the search query.

* * * * *